United States Patent [19]
Mooney et al.

[11] Patent Number: 5,610,981
[45] Date of Patent: *Mar. 11, 1997

[54] PREBOOT PROTECTION FOR A DATA SECURITY SYSTEM WITH ANTI-INTRUSION CAPABILITY

[75] Inventors: David M. Mooney, Eden Prairie; Joseph A. Kimlinger, Willernie; David E. Wood, Minnetonka, all of Minn.

[73] Assignee: Integrated Technologies Of America, Inc., Hopkins, Minn.

[*] Notice: The term of this patent shall not extend beyond the expiration date of Pat. No. 5,327,497.

[21] Appl. No.: 395,627

[22] Filed: Feb. 28, 1995

Related U.S. Application Data

[63] Continuation-in-part of Ser. No. 204,618, Mar. 1, 1994, abandoned, which is a continuation-in-part of Ser. No. 893,670, Jun. 4, 1992, Pat. No. 5,327,597.

[51] Int. Cl.⁶ .................. H04K 1/00; H04L 9/00
[52] U.S. Cl. ........................ 380/25; 340/825.34
[58] Field of Search .................. 380/23, 25; 340/825.34

[56] References Cited

U.S. PATENT DOCUMENTS

| | | |
|---|---|---|
| 4,465,901 | 8/1984 | Best . |
| 4,525,599 | 6/1985 | Curran et al. . |
| 4,742,215 | 5/1988 | Daughters et al. . |
| 4,757,533 | 7/1988 | Allen et al. ........................ 380/25 |
| 4,797,928 | 1/1989 | Dykes . |
| 4,817,140 | 3/1989 | Chandra . |
| 4,933,898 | 6/1990 | Gilberg et al. . |

(List continued on next page.)

FOREIGN PATENT DOCUMENTS

| | | |
|---|---|---|
| 0170716 | 2/1986 | European Pat. Off. . |
| 0190733 | 8/1986 | European Pat. Off. . |
| 0216375 | 4/1987 | European Pat. Off. . |
| 0262025 | 3/1988 | European Pat. Off. . |
| 0458614 | 5/1990 | European Pat. Off. . |
| 0456548 | 11/1991 | European Pat. Off. . |

(List continued on next page.)

OTHER PUBLICATIONS

International Search Report for Application Number PCT/US 95/02579; completed by Examiner Powell, dated 29 Nov. 1995; 3 pages.

SmartDisk Security Corp., "Safeboot™ PC Security System," product brochure, 2 pgs., 1993.

SuperCrypt Specification from CE Infosys, "High Speed Cryptographic Data Security Device," pp. 1–35.

CE Infosys-CryptCard, "Security System for Notebooks," pp. 1–14.

(List continued on next page.)

*Primary Examiner*—Stephen C. Buczinski
*Attorney, Agent, or Firm*—Schwegman, Lundberg, Woessner & Kluth, P.A.

[57] ABSTRACT

A secure computer controlling access to data storage devices via a card reader. A microprocessor-controlled card reader interface logically connected to the card reader and the central processing unit (CPU) of the computer reads and writes information from and to a card placed in the card reader and performs additional functions in response to commands received from the CPU. The card reader interface includes an encryption engine for encrypting data in a data storage device and a boot ROM containing verification program code executed during an initialization procedure. The verification program verifies that a valid user card has been placed in the card reader, reads one or more questions from the user card, asks the questions of the user and verifies the answers against the contents of the card. If authorization is verified, the card reader interface permits the user to access the encrypted data. Otherwise the user is denied access to the data by one or more of the following methods: freezing the system bus, and requiring the user to reset the computer and re-enter the verification program; logically destroying the data in the data storage devices; and physically destroying the data storage devices.

33 Claims, 14 Drawing Sheets

U.S. PATENT DOCUMENTS

| | | |
|---|---|---|
| 5,048,085 | 9/1991 | Abraham et al. . |
| 5,065,429 | 11/1991 | Lang . |
| 5,091,939 | 2/1992 | Cole et al. . |
| 5,159,629 | 10/1992 | Double et al. . |
| 5,210,795 | 5/1993 | Lipner et al. . |
| 5,212,729 | 5/1993 | Schafer ............... 380/4 |
| 5,327,497 | 7/1994 | Mooney et al. ............ 380/25 |

FOREIGN PATENT DOCUMENTS

| | | |
|---|---|---|
| 0182244 | 5/1996 | European Pat. Off. . |
| 2584514 | 1/1987 | France . |
| 2596173 | 9/1987 | France . |
| 2112190 | 7/1983 | United Kingdom . |
| 2181281 | 4/1987 | United Kingdom . |
| WO93/24906 | 12/1993 | WIPO . |

OTHER PUBLICATIONS

BITS: A Smartcard Protected Operating System, *Communications Of The ACM*, Nov. 1994, vol. 37, No. 11, pp. 66–94.

"510 Pro –The Professional Data Protection Software", *Litronic Product Brochure*, 1 pg, (Publication Date Unknown).

"Argus 300 –The Professional Data Protection Solution", *Litronic Product Brochure*, 1 pg, (Publication Date Unknown).

"Command Software Systems", *Product Brochure*, 8 pgs. (Publication Date Unknown).

"Unisys–Single Point Security", *A Client/Server System White Paper*, Unisys Corporation, 27 pgs, (1995).

"Unisys –Securing the right information", Source Unknown, 1 pg, (Publication Date Unknown).

PREBOOT PROTECTION FOR A DATA SECURITY SYSTEM WITH ANTI-INTRUSION CAPABILITY

CROSS REFERENCE TO RELATED APPLICATION

This application is a continuation-in-part of U.S. patent application Ser. No. 08/204,618, filed on Mar. 1, 1994, now abandoned, which is a continuation-in-part of U.S. patent application Ser. No. 07/893,670, filed on Jun. 4, 1992, and issued Jul. 5, 1994 as U.S. Pat. No. 5,327,497.

TECHNICAL FIELD OF THE INVENTION

The present invention pertains generally to computer security systems, and more particularly to a microprocessor-controlled system for controlling user access to and dissemination of secure data stored in a secure computer.

BACKGROUND OF THE INVENTION

There has been an enormous increase in the use of computers for processing and storing sensitive information in a wide variety of commercial and government applications. Computer systems have evolved from large systems with restricted access to small systems which may be portable and easily accessed by several users. As components have become more easily accessible and as demand for easy computer access has spread, there has arisen a greater need for the protection of sensitive data.

One method for securing access to computer systems is to restrict the physical access to the computer system, however, such restriction is inefficient for typical computer system installations which favor shared access and increased portability. The cost of securing computer systems by restricting physical access is also prohibitive.

Another method for providing security of sensitive data is to use a program to restrict access to the computer system. However, this method has drawbacks. For instance, an unauthorized user can often bypass the security program or routines which invoke the security program to gain access to the computer system. Even if the security program proves to be difficult to bypass, the unauthorized user can simply remove the information stored in the computer by removing the memory or monitoring the data bus. For example, a hard drive could be removed from the computer and installed in another computer to read the contents of the hard drive.

To prevent such unauthorized access and retrieval of sensitive information, sensitive data may be destroyed either logically or physically. Logical destruction requires that any data destroyed be unintelligible to another user after the destruction process has taken place. The storage media will typically still be reusable. An example of a logical destruction program is a program which erases the sensitive files on a hard drive when an unauthorized access is detected. Physical data destruction, on the other hand, requires catastrophic destruction of the storage media to ensure that the contents in the storage media are irretrievably lost.

In some applications the program destroying the logical data fails to completely destroy the data and advanced data retrieval techniques may be employed to recover traces of logically destroyed information. For example, information on a hard drive of a computer may be recovered by methods which detect previously written and erased binary words from trace magnetic remnants of the words. If the logical destruction methods are only partially effective, physical destruction techniques may also be required to ensure that the data is destroyed and cannot be recovered.

It may be desirable to restrict access to particular peripheral devices on a computer or workstation, rather than restricting access to the entire computer system. Modern computer security systems fail to provide such restricted access.

Therefore, there is a need in the art for a computer security system which prohibits unauthorized access and which is not vulnerable to bypass yet maintains the portability mad flexibility inherent in a modem computer system. There is a further need to provide complete protection of sensitive data such that the data may not be recovered by bypassing the data protection system or by physical removal of data storage devices. Finally, the system must also provide complete destruction of sensitive data to prevent retrieval of data traces.

SUMMARY OF THE INVENTION

To overcome these and other shortcomings and limitations in the art which will become apparent to those skilled in the art upon reading and understanding the following detailed description, the present invention provides a system for controlling access to sensitive information on a computer without compromising the security of sensitive data. The present invention restricts computer access to authorized users. In addition, it detects attempts to imitate an authorized user to gain access. Further, the present invention provides for configurable logical and physical destruction of sensitive data, and provides means for adjusting the threshold requirement for destruction and the level of destruction to suit the degree of security required for the information stored on the computer. Finally, the present invention provides a means, under the control of a centralized authorization security administrator, for limiting access to portions of the overall computer system depending on the access privileges configured for each individual user.

In one embodiment of the present invention, a microprocessor-controlled card reader interface logically connected to the CPU of the computer reads and writes information from and to an integrated circuit card ("card" or "smart card") placed in the card reader. The information read is presented to the CPU to determine whether the user is authorized to use the computer; the CPU then specifics which peripherals the user is authorized to access. A card reader interface board logically connected to the data and address buses of a computer monitors address bus of the computer and restricts access to the data storage devices and configurable ports in the system and executes a special verification program to verify authorization of the user.

According to one embodiment of the present invention, when a valid user card is placed in the card reader one or more questions are read from the card and displayed to the user. The user's responses are compared to the correct answers stored on the card and, if the responses match the correct answers, the CPU is allowed to access all peripherals the user has been authorized to use. Computer security is improved by coordinating identification information received from the card, user, and computer RAM to ensure proper verification. The system requires that the same card, user, and computer be used to control access.

In one embodiment of this invention, the system provides for a method of initializing and authorizing a user card with a security administrator card. Upon a valid security administrator card being placed in the card reader, a security administrator initializes and authorizes one or more individual user cards by selecting from a list of menu options displayed to the security administrator. The security administrator inputs a list of questions and answers which are then stored on the user card for use during the verification procedure.

In one embodiment of the present invention, the system provides for a hierarchy of access privileges by encoding access codes directly on the card which allow users with superior access privileges to access data on computers of users with inferior access privileges. The same coding system prevents the users with inferior access privileges from accessing the computers of those with superior access privileges.

In one embodiment of the present invention, the system provides for the physical or logical destruction of data in response to unauthorized attempts by a user to violate the physical or logical integrity of the computer system. The physical and logical destruction of data may be disabled for maintenance or configuration purposes by use of a maintenance card.

The preceding and other features and advantages of the invention will become further apparent from the detailed description that follows. This description is accompanied by a set of drawing figures. Numerals are employed throughout the written description and the drawings to point out the various features of this invention, like numerals referring to like features throughout.

BRIEF DESCRIPTION OF THE DRAWINGS

In the drawings, where like numerals describe like components throughout the several views.

DETAILED SPECIFICATION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1A:
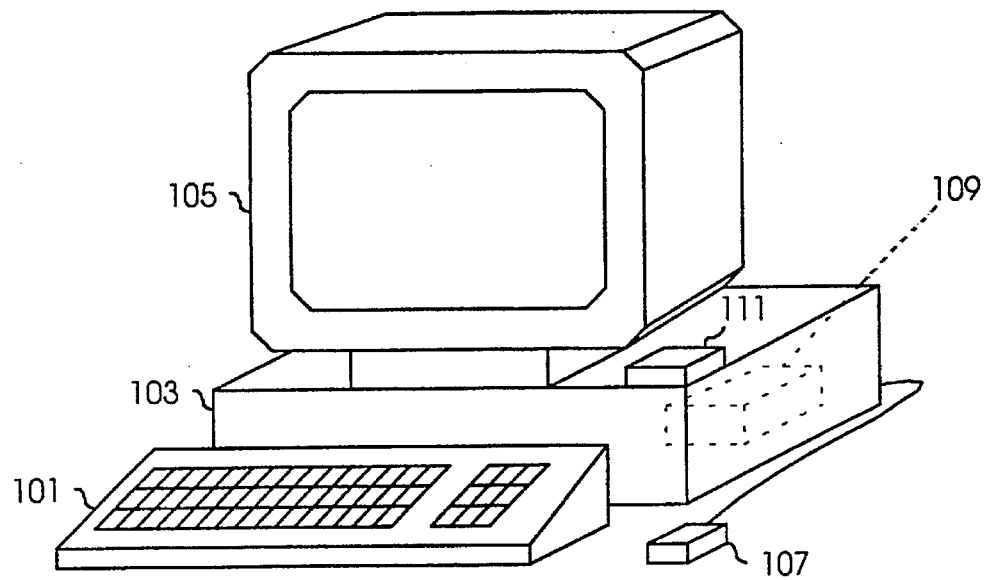
FIG. 1A is a perspective view of a first embodiment of a secure computer system implemented according to the present invention.

FIG. 1A shows the components of a computer system to be secured with a card reader interface according to a first embodiment of the present invention. This embodiment was shown in U.S. patent application Ser. No. 07/893,670, filed Jun. 4, 1992, by Mooney, et. al, the discussion of which is herein incorporated by reference. The computer system includes a keyboard 101 by which a user may input data into the system, a computer chassis 103 which holds electrical components and peripherals, a screen display 105 by which information is displayed to the user, and a pointing device 107, the system components logically connected to each other via the internal system bus of the computer. A card reader 111 is connected to the secure computer system via card reader interface board 109. The preferred card reader 111 is an Amphenol®"Chipcard" acceptor device, part number 702-10M008 5392 4794, which is compatible with International Standards Organization (ISO) specification 7816, although one skilled in the art would readily recognize that other card reader devices which conform to ISO 7816 may be substituted.

Figure 1B:
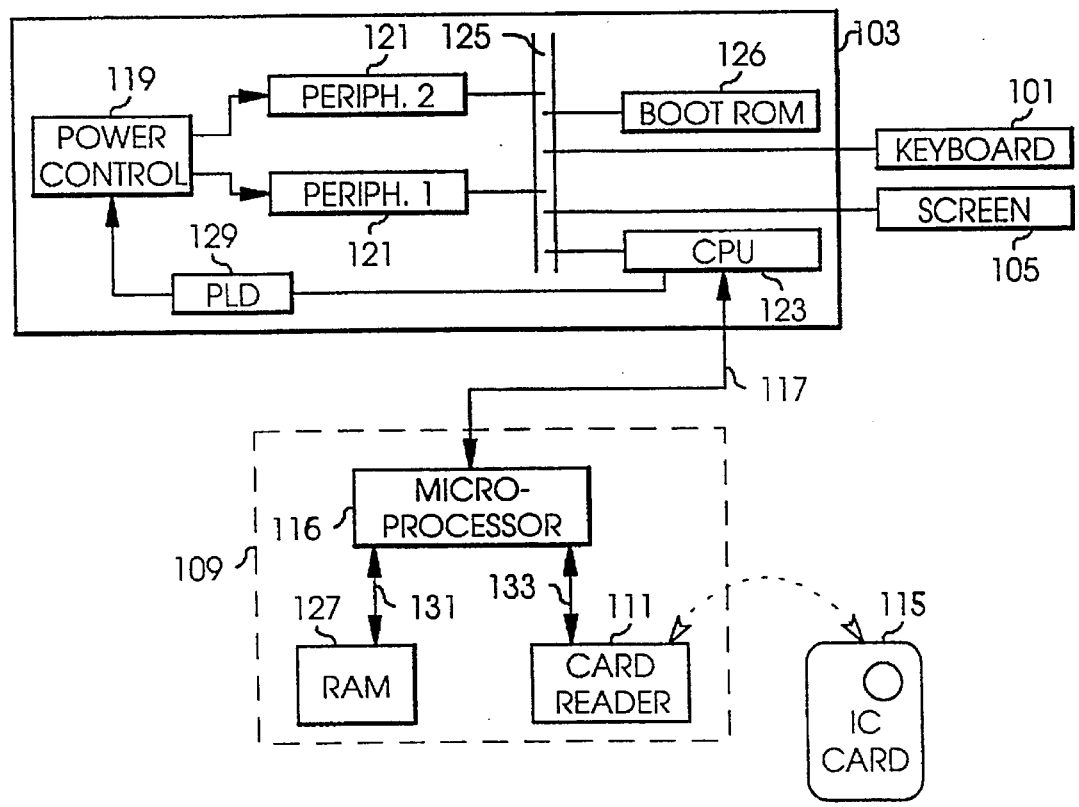
FIG. 1B is a block diagram showing the high-level architecture of a first embodiment of a secure computer system implemented according to the present invention.

In order for the computer system to be secured, a card reader interface is integrated into the computer system in a manner similar to that as revealed in FIG. 1B. A card reader interface board 109 contains a microprocessor 116 connected to the CPU of the computer via a second data bus 117, connected to RAM 127 via a third data bus 131, and connected to the card reader 111 via a Fourth data bus 133. The interface board 109 is typically implemented with printed circuit board technology, although other equivalent technologies may be substituted without loss of generality. Peripherals 121 within computer 103 are controlled by the CPU 123 and PLD 129 with a power control circuit 119, which turns power off and on to peripherals 121. A system boot ROM 126 logically connected to the CPU 123 to start executing a non-volatile program contained in PLD 129 upon initialization of the computer during power-up, clear, or warm-boot reset.

An IC card 115 is used in conjunction with card reader 111. The preferred card 115 is a MICRO CARD® or GEMPLUS® card (for example, Scot 100, TB 100, or COS IC cards), which is compatible with ISO 7816. By conforming to this standard, the card 115 enables the support of Data Encryption Standard (DES) data encryption and decryption functions. One skilled in the art would readily recognize that other cards which conform to this standard and provide data encryption and decryption functions may be substituted. The ability to encrypt and decrypt data is important, since the present invention is designed to ensure that unencrypted sensitive data does not reside in the CPU where it could be read by an unauthorized user.

Figure 1C:
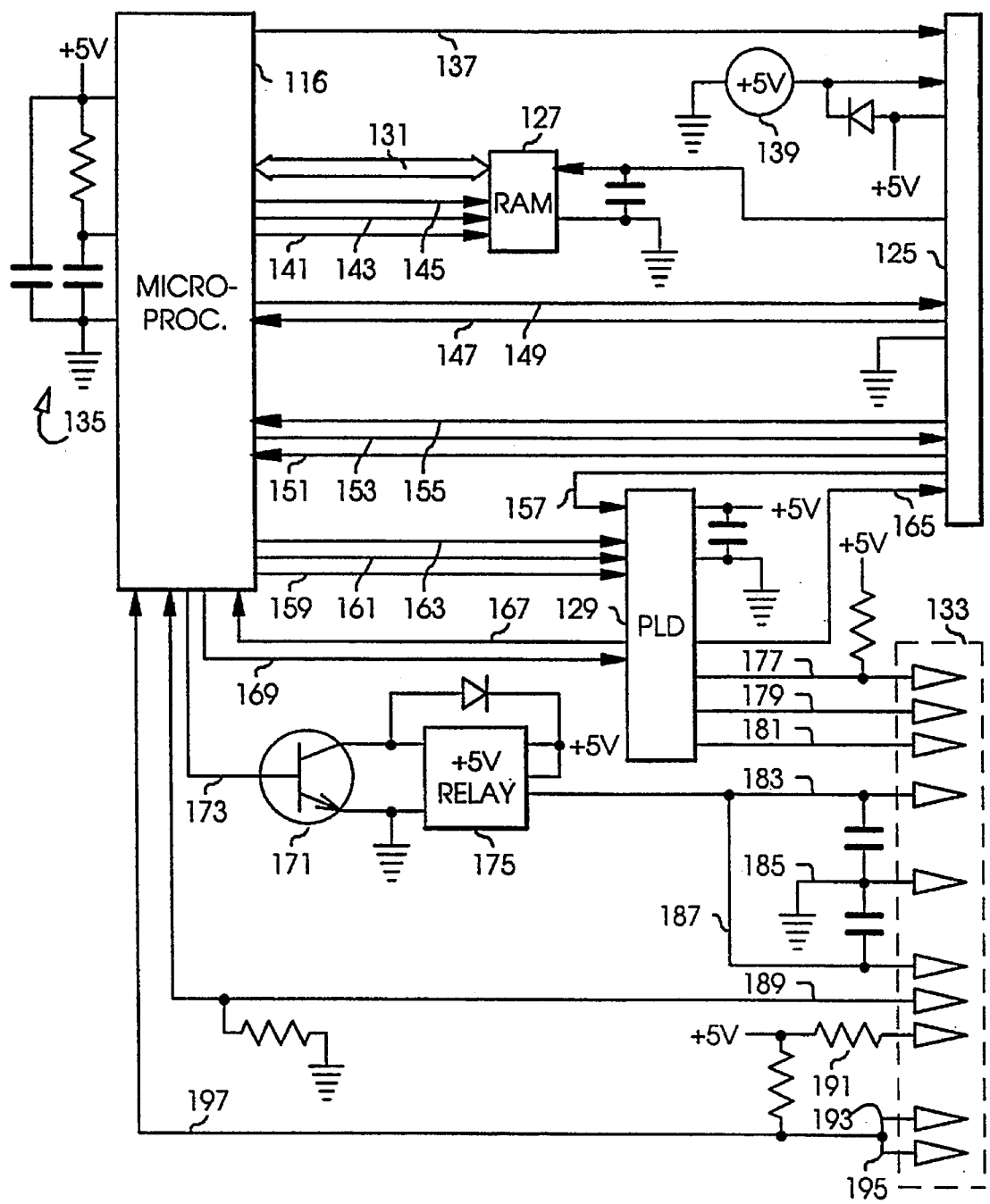
FIG. 1C is an electrical block diagram showing the microprocessor-controlled card reader interface for a first embodiment of a secure computer system according to the present invention.

The schematic for card reader interface 109 is described in greater detail in FIG. 1C. Microprocessor 116 is powered by circuit 135, and controls system functions via connections to the system data bus 125. System resets are initiated by clear line 137. Validation and authorization information is transferred between the microprocessor 116 and RAM 127 via the third data bus 131 in conjunction with address or data select line 141, strobe line 143, and chip select line 145. Backup power is provided for RAM 127 by a +5 volt lithium battery 139.

The microprocessor 116 communicates with system data bus 125 as a serial communications device using CTS line 147, DTR line 149, 10 MHz clock line 151, serial data out line 153, and serial data in line 155. A separate 3.5 MHz clock line 157 is used to provide a clock signal to PLD 129, which is used by the microprocessor 116 for card reset control via line 159, card serial data control via line 161, and card interrupt control via line 163. The PLD 129 in turn connects to the card via card serial data contact 177, card clock contact 179, and card reset contact 181.

Microprocessor 116 also has the ability to control the physical destruction of data within the computer system via line 165. A physical destruction device may be triggered using line 165 as a destruct signal. For example, line 165 may be connected to a mechanism containing a chemical solution which is sprayed onto a hard disk contained in the secure computer system when an unauthorized user attempts to violate the physical or logical integrity of the computer system. Several destruct mechanisms are taught in the prior art, and one of ordinary skill in the art would recognize that other equivalent destruction chemicals and mechanisms may be substituted without loss of generality.

The microprocessor 116 uses power control line 173 with switch 171 and +5 volt relay 175 to provide power to the card via card logic voltage supply contact 183 and card programming contact 187. The card is grounded via card ground contact 185, and detected by applying power through card detect power contact 191 to microprocessor 116 by card detect contact 189. Card contacts 193 and 195 and line 197 are reserved for future use.

Figure 1D:
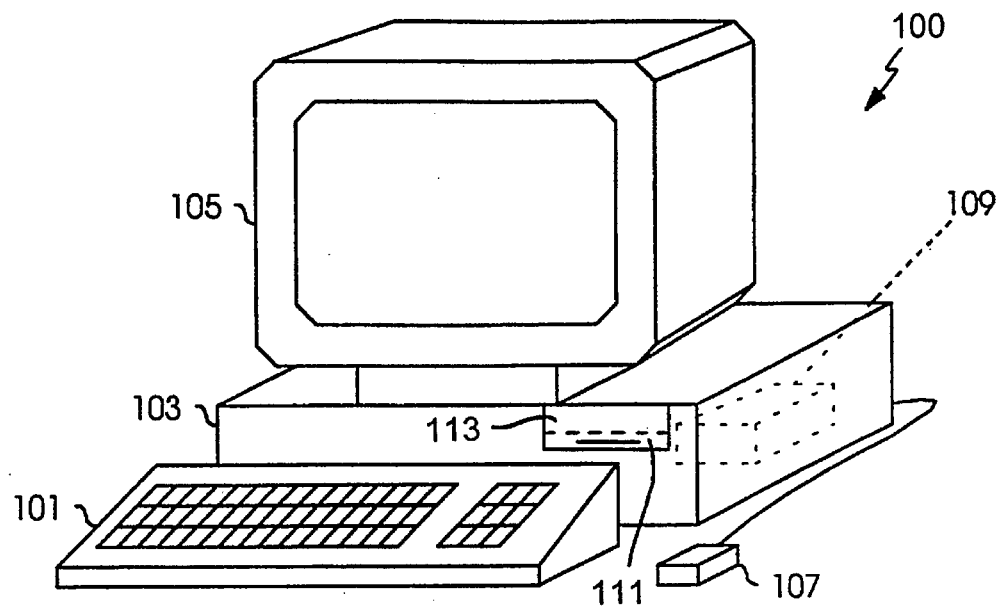
FIG. 1D is a perspective view of a second embodiment of a secure computer system implemented according to the present invention.
Figure 1E:
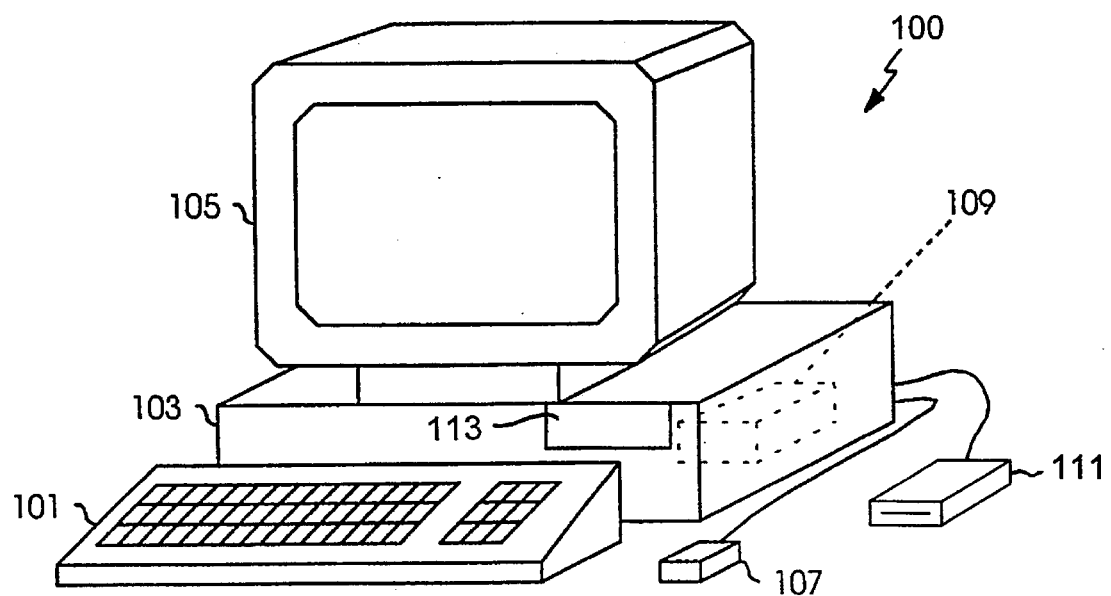
FIG. 1E is a perspective view of a third embodiment of a secure computer system implemented according to the present invention.

FIG. 1D shows the components of a second embodiment of a secure computer system according to the present invention. Secure computer system 100 includes a keyboard 101 by which a user may input data into the system, a computer chassis 103 which holds electrical components and peripherals, a screen display 105 by which information is displayed to the user, a secure hard drive 113, and a pointing device 107, the system components logically connected to each other via the internal system bus of the computer. A card reader 111 is connected to the secure computer system via card reader interface board 109. As in the first embodiment, the preferred card reader 111 is an Amphenol® "Chipcard" acceptor device, part number 702-10M008 5392 4794, which is compatible with International Standards Organization (ISO) 7816 specifications. One skilled in the art would readily recognize, however, that other card reader devices which conform to ISO 7816 may be substituted. FIG. 1D shows card reader 111 and secure hard drive 113 co-located in a single peripheral bay. Other mounting techniques are available, however, which would not modify the scope of the present invention, for example, positioning card reader 111 externally as shown in FIG. 1E.

Figure 2A:
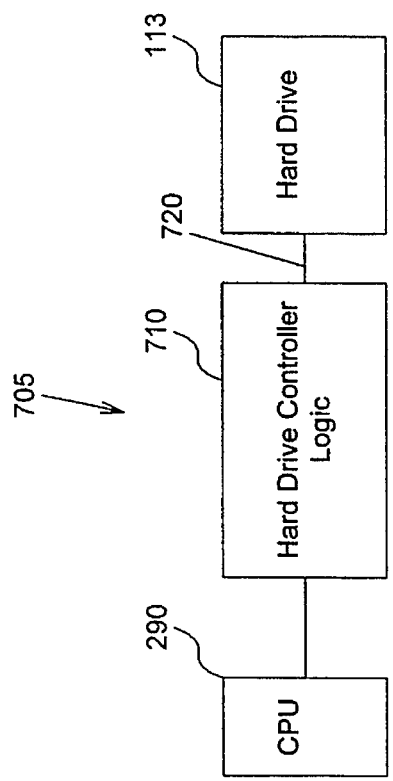
FIG. 2A is a block diagram of a computer system with a hard drive and interface board.
Figure 2B:
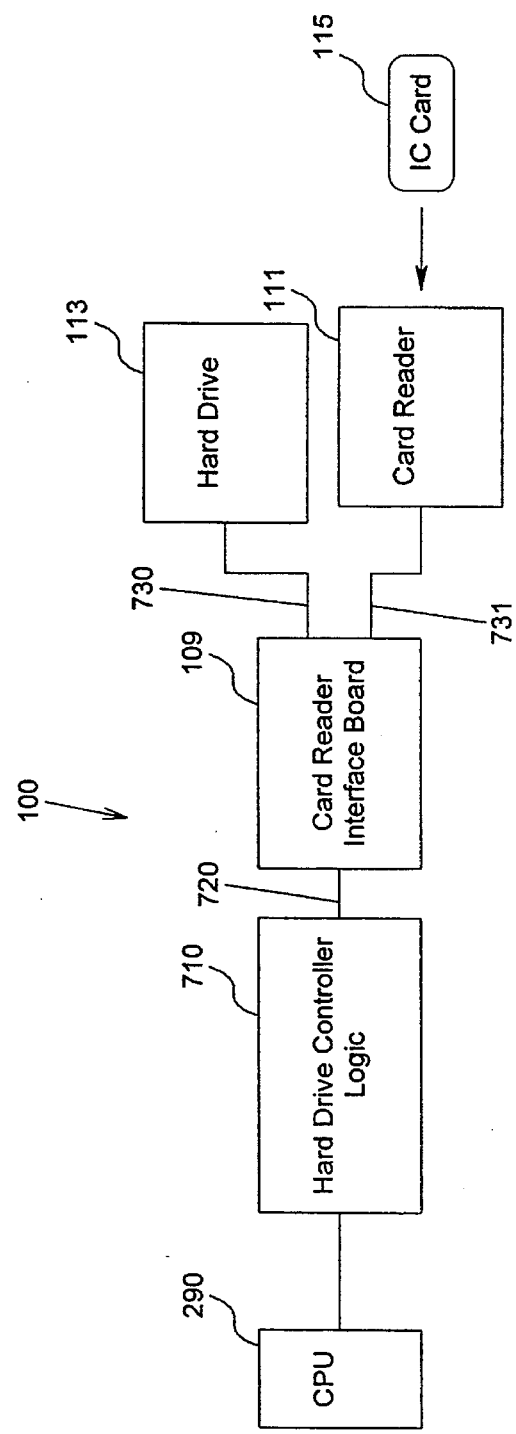
FIG. 2B is a block diagram showing how a computer system with hard drive is modified to create a secure computer system according to a second embodiment of the present invention.

FIGS. 2A and 2B illustrate the modifications required of a standard personal computer system 705 in order to create a secure computer system 100 according to the present invention. FIG. 2A is a simplified block diagram of a computer system 705 commonly found in the prior art. Central processing unit (CPU) 290 is connected to dedicated hard drive controller logic 710 which serves as an interface for the computer system to hard drive 113. Typically, hard drive controller logic 710 is a printed circuit board which is installed in the backplane or integrated into the motherboard of computer 100, and hard drive controller logic 710 is connected to hard drive 113 using a multiconductor cable 720. Hard drive 113 may be mounted externally to computer 705, or internally.

FIG. 2B shows how the standard personal computer 705 is converted to a secure computer system according to one embodiment of the present invention. In FIG. 2B, secure computer system 100 is formed by adding integrated circuit (IC) card 115 and attaching card reader 111, cable 730, and card reader interface board 109 to system 705. Card reader 111 may be added to the system by removing cable 720 from hard drive 113 and connecting it to card reader interface board 109, then connecting card reader 111 to card reader interface board 109 via cable 731. Hard drive 113 is connected to card reader interface board 109 using cable 730.

Card reader 111 acts in concert with card reader interface board 109 to limit access to sensitive data stored both on hard drive 113 and card reader interface board 109. Integrated circuit card 115 is preprogrammed with information used to verify that the user is authorized to access the sensitive data stored on hard drive 113. Security for sensitive data stored on hard drive 113 is provided by requiring a minimum of three distinct sources of authorization verification information in order to access the sensitive data. In order to gain access to the sensitive information stored on hard drive 113, both card 115 and card reader interface board 109 must present proper identification information and the user must enter a series of predetermined answers to a series of predetermined questions. If any of the sources of identification information is incorrect, board 109 may prevent access to the secure computer system 100 by freezing the system bus 292 (requiring cycling of the system power to reset secure computer system 100), logically destroying any sensitive data on the system, or physically destroying the storage devices containing sensitive information.

Figure 3:
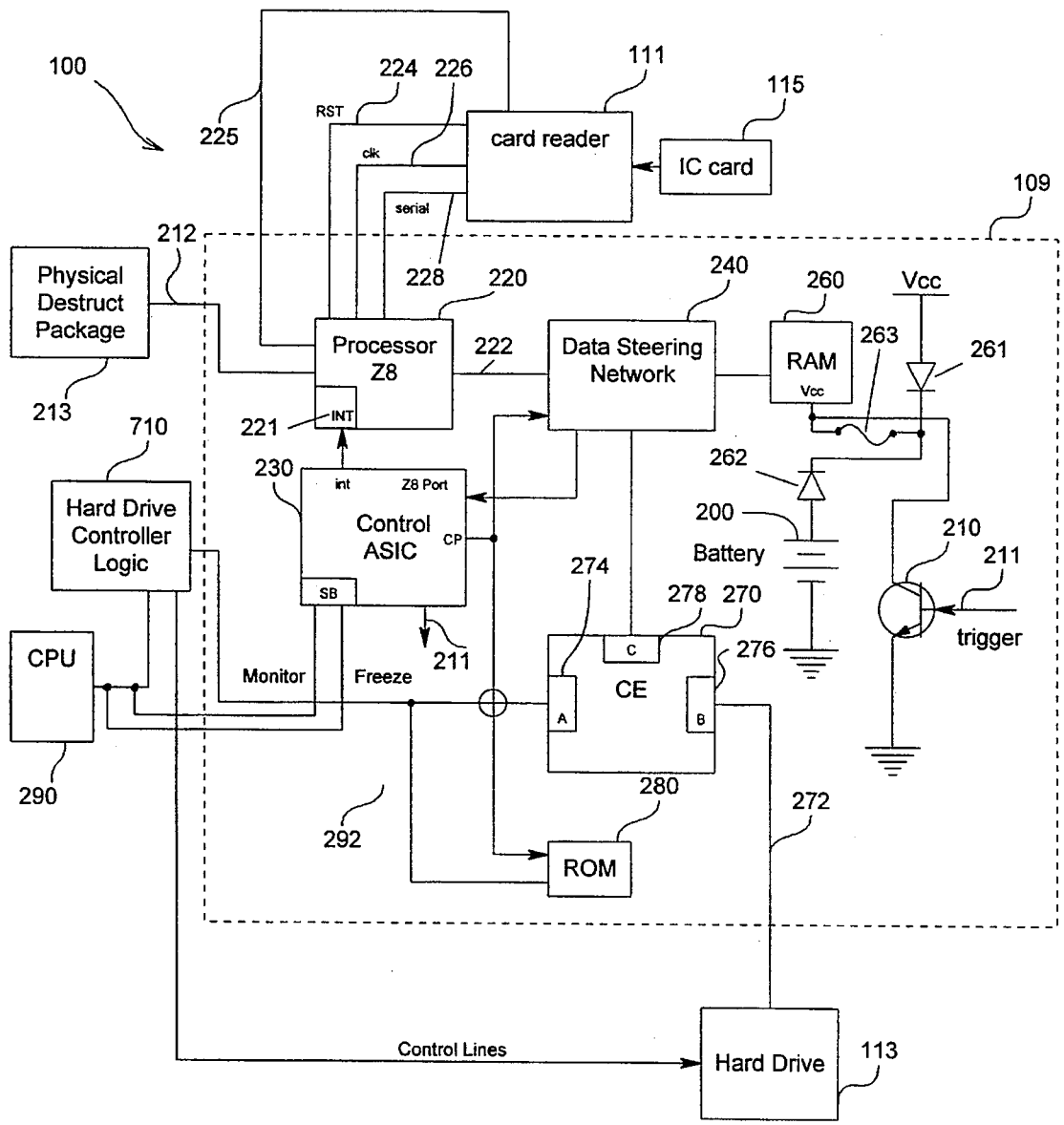
FIG. 3 is a block diagram showing the high level architecture of a secure computer system according to a second embodiment of the present invention.

The details of one embodiment of the present invention will be specified in greater detail using the following figures. FIG. 3 is a detailed electrical block diagram of the secure computer system 100 of FIG. 2B, showing connections between card reader interface board 109, card reader 111, secure hard drive 113, and central processing unit (CPU) 290. In the present invention, independent, dedicated data buses are employed such that card reader interface board 109 communicates with card reader 111 via card reader bus 225, hard drive 113 via hard drive bus 272, and CPU 290 via hard drive controller logic 710 and system bus 292. (hard drive bus 272 is analogous to cable 730 of FIG. 2B and system bus 292 is analogous to cable 731 of FIG. 2B.) The utilization of independent dedicated data buses for communications with card reader 111, hard drive 113, and CPU 290 decreases the chances for retrieval of sensitive data and encryption information, since system bus 292 transfers only unencrypted data to the computer system from card reader interface board 109. An unauthorized intruder would have to monitor all three buses to attempt to decipher the encryption codes used and the method by which the security system interacts with the computer system.

FIG. 3 also shows the interconnections of the components on card reader interface board 109. In one embodiment, the card reader interface board 109 contains a Zilog Z86C6116 processor 220 for controlling data transfer between card reader 111, hard drive 113, and CPU 290. The Z86C6116 is an 8-bit data bus, 16-bit time-multiplexed address bus microprocessor specified in the Zilog Z8 Microcontrollers Book, DC8305-01 (1993), which is incorporated herein by reference. Other microprocessors may be readily substituted without materially affecting the scope of the present invention.

Processor 220 controls the transfer of data on card reader interface board 109 by issuing commands to control ASIC 230. Control ASIC 230 acts as "glue logic," under control of processor 220, coordinating the operation of data steering network 240, cipher engine 270, and processor 220 to control information transfer between CPU 290, RAM 260, and hard drive 113.

Figure 5:
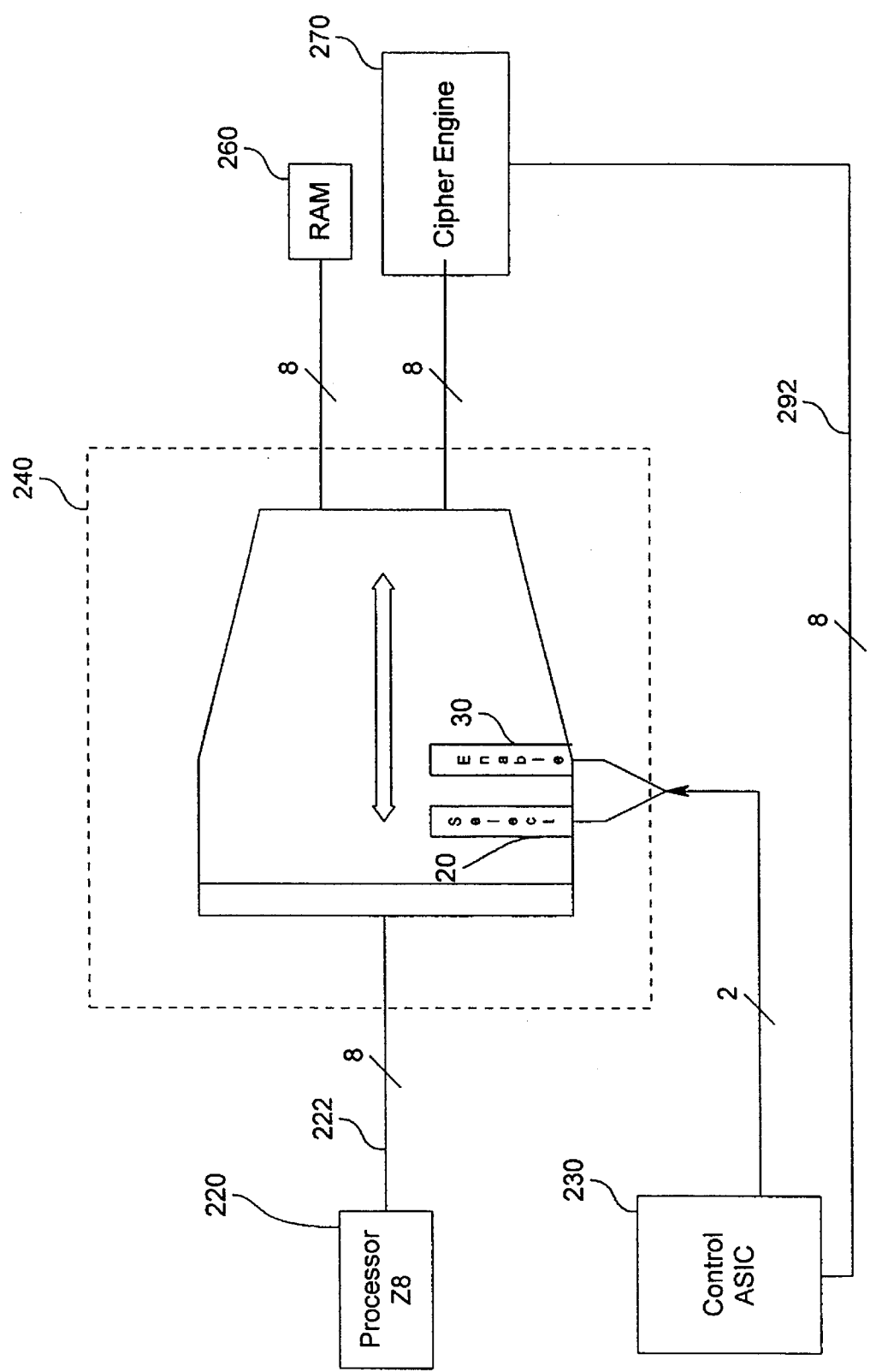
FIG. 5 shows a block diagram illustrating the operation of one embodiment of the data steering network shown in FIG. 3.

Data steering network 240 is an 8-bit controllable input and output port circuit designed to allow processor 220 to communicate with RAM 260 and cipher engine (CE) 270, but to prevent unauthorized access by a user controlling system bus 292 to retrieve data from RAM 260. FIG. 5 is a block diagram showing the operation of the data steering network 240. Data steering network 240 essentially operates as an eight bit wide bidirectional parallel multiplexer which limits data transfer from processor 220 to RAM 260, or alternatively to CE 270 (and, therefore, potentially to system bus 292 if port A 274 and port C 278 of CE 270 is connected). Attempts to read information from the address space assigned to RAM 260 which originate from the system bus 292 are impossible, since RAM 260 is logically isolated such that no address space exists from system bus 292 to access RAM 260.

Returning to FIG. 3, in one embodiment cipher engine (CE) 270 is an 8-bit NSA certified DES encryption engine meeting specification DES 3. Such a device is manufactured by Computer Elektronik as part number CE99C003. Further information detailing the operation of that embodiment of CE 270 may be found in CE Infosys 99C003 Data Sheet Version 1.01, which is herein incorporated by reference.

CE 270 is controlled by processor 220 via data steering network 240 by commands received at port C 278. CE 270 may be instructed by processor 220 to provide a data path between port C 278 and port A 274 (no encryption) or between port A 274 and port B 276 (DES encrypted data output from port B 276, and nonencrypted data from port A 274). During system initialization a data path between data steering network 240 and system bus 292 is created using port C 278 and port A 274 whereby nonencrypted data can be transferred under control of processor 220 to system bus 292 via hard drive controller logic 710. Once user authorization is verified and there are no pending security violations detected, CE 270 uses a key to DES encrypt data transmitted by port B 276 to hard drive 113. Similarly, CE 270 deciphers encrypted data from hard drive 113 and presents it to system bus 292 via hard drive controller logic 710 when port A 274 to port B 276 channel is allowed. One skilled in the art would readily recognize that other cipher engines which conform to the above-mentioned standards and support data encryption may be substituted without materially modifying the spirit and scope of the present invention.

RAM 260 is subdivided into secure and open segments by memory mapping the secure segments such that they are accessible only to processor 220. This prevents both accidental and intentional loss of secure information from the RAM 260 to the system bus 292. RAM 260 is addressable only by processor 220 and contains DES base kernel key encryption information and answers to verification questions retrieved from card 115 by processor 220. The open portion of RAM 260 contains the verification questions retrieved from card 115 and other nonsensitive data.

Figure 6:
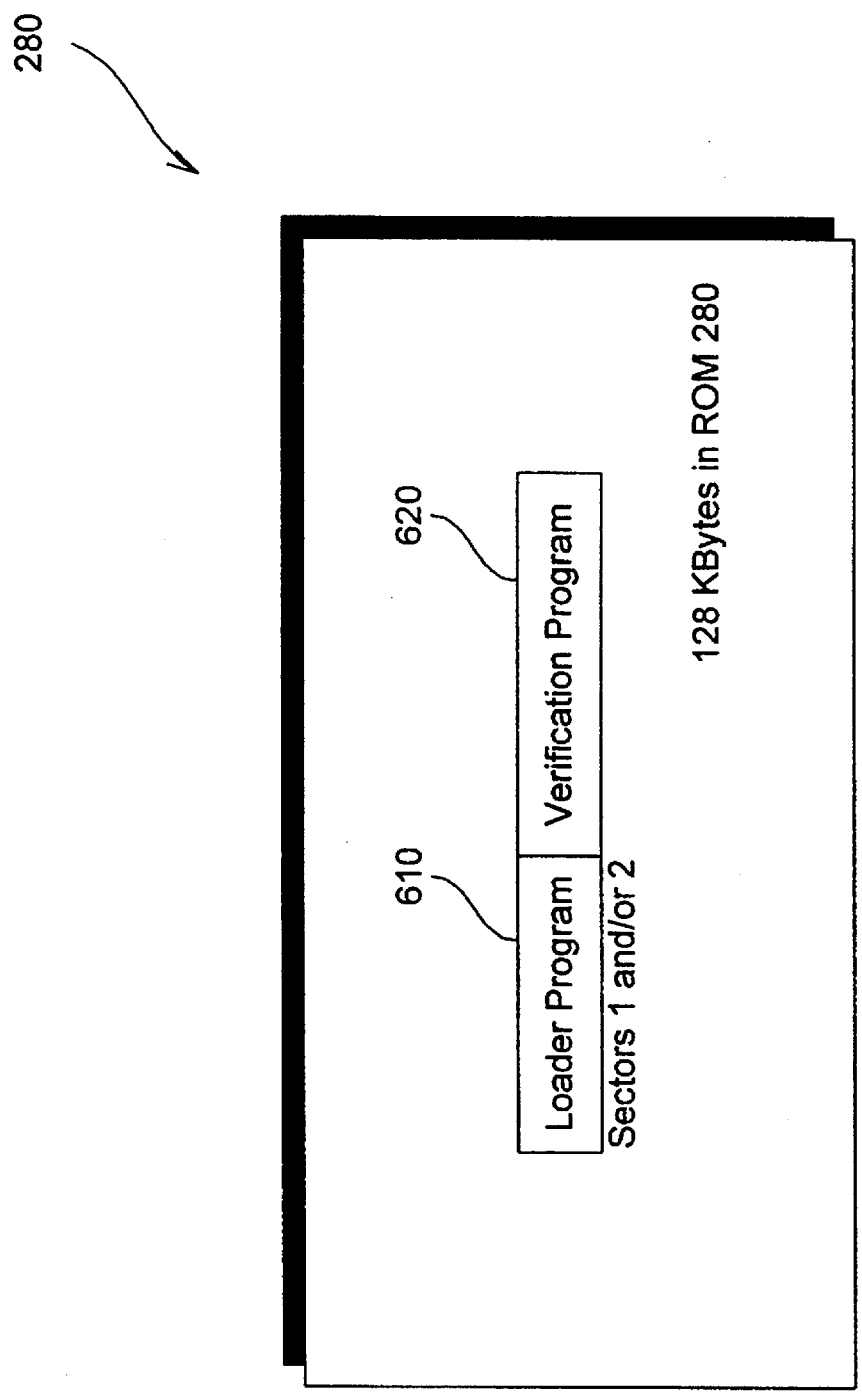
FIG. 6 is a block diagram showing the loader program and verification program resident in the read only memory (ROM) of one embodiment of the card reader interface board of FIG. 3.
Figure 7A:
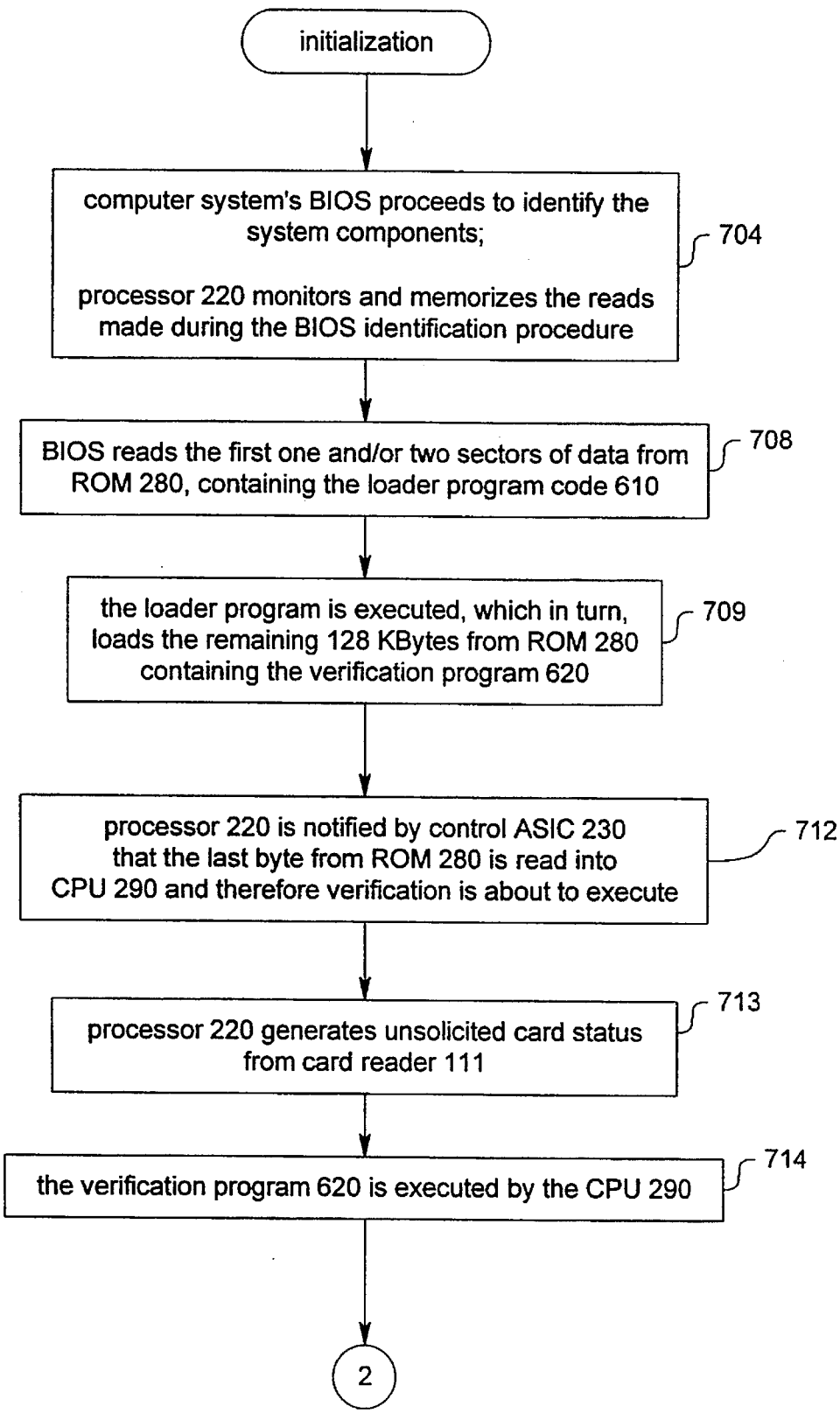
FIGS. 7A, 7B, 7C, and 7D are a flow diagram showing program steps taken to initialize and execute the security portion of a secure computer system program according to the present invention.
Figure 7B:
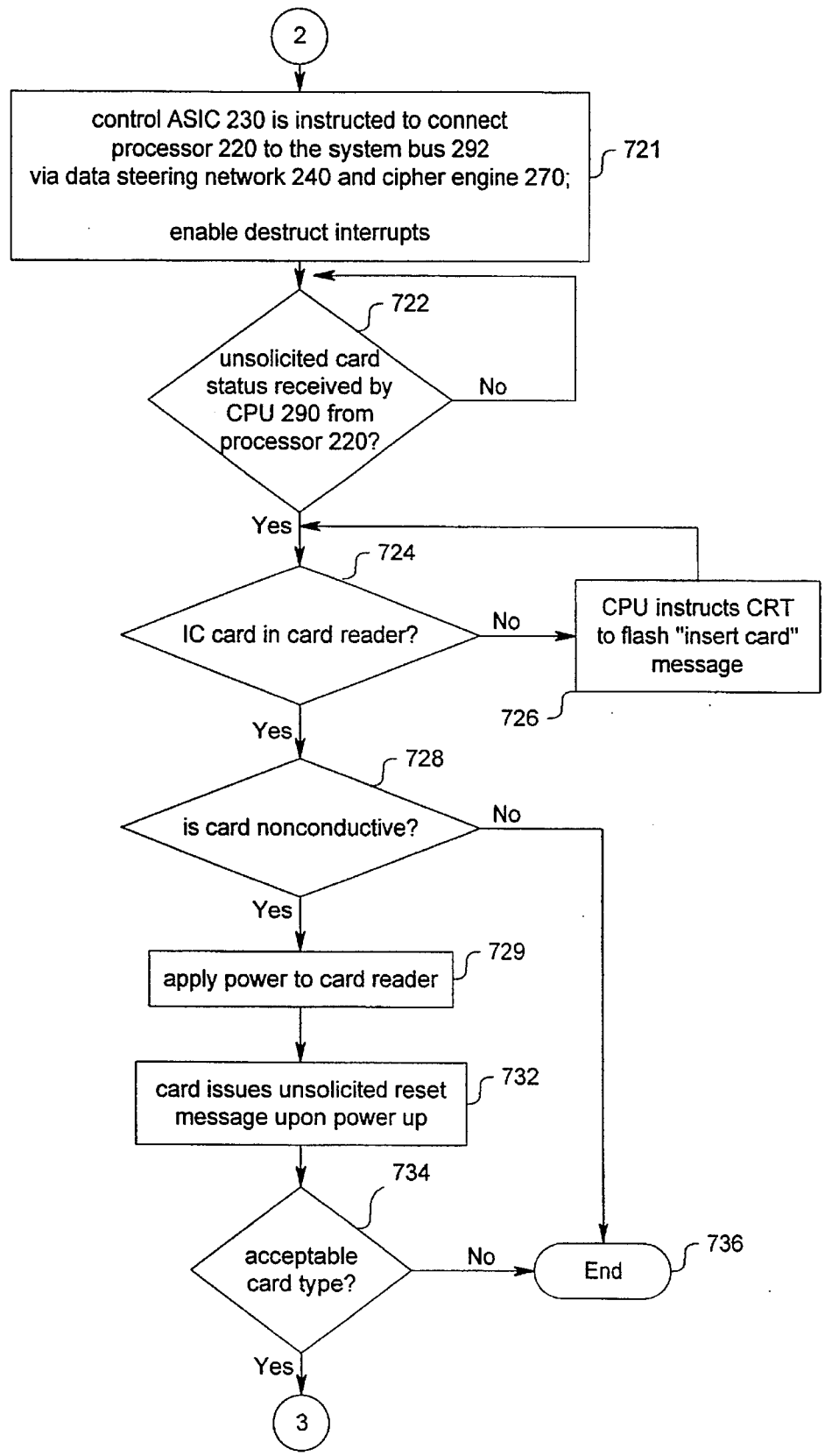
Figure 7C:
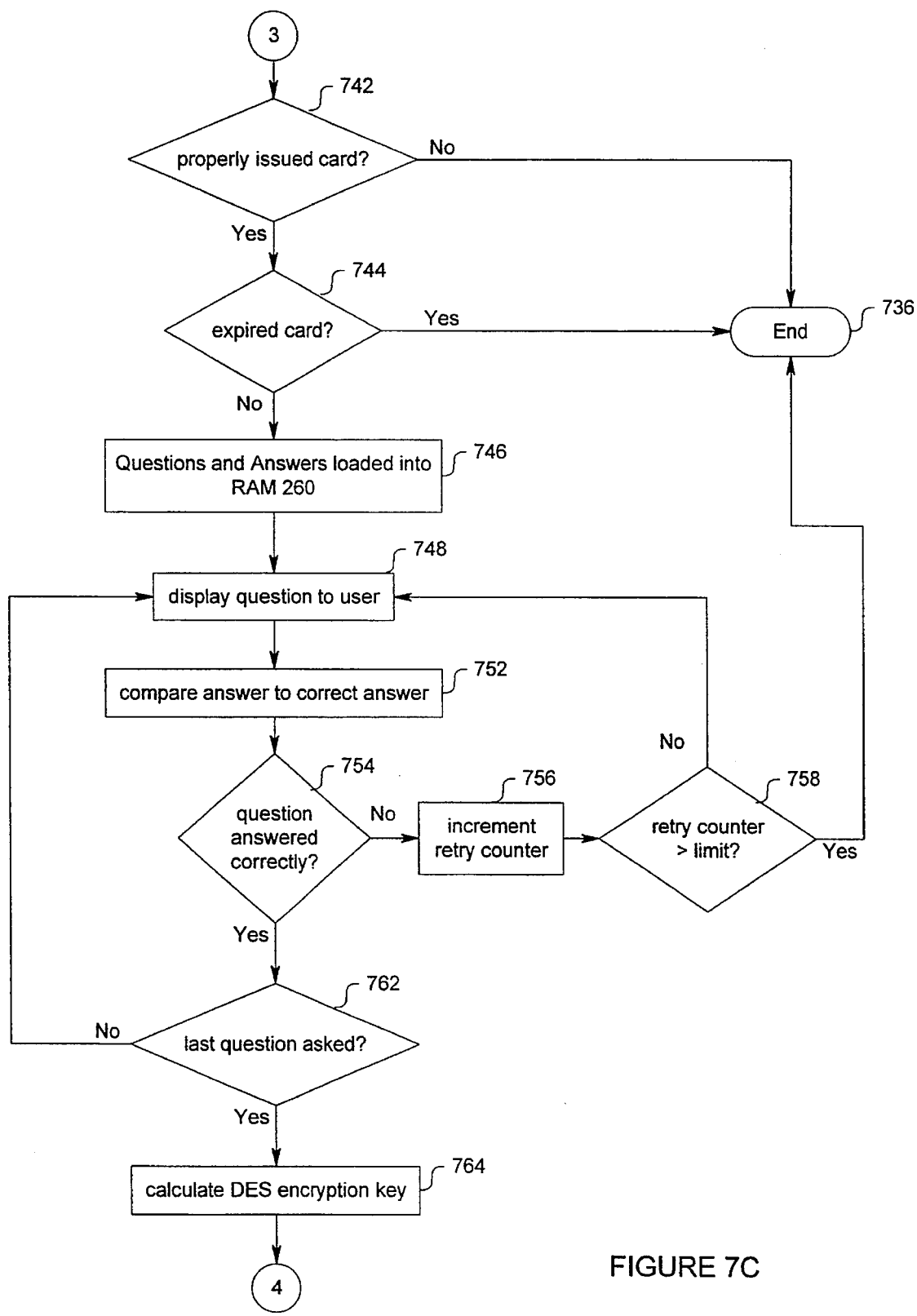
Figure 7D:
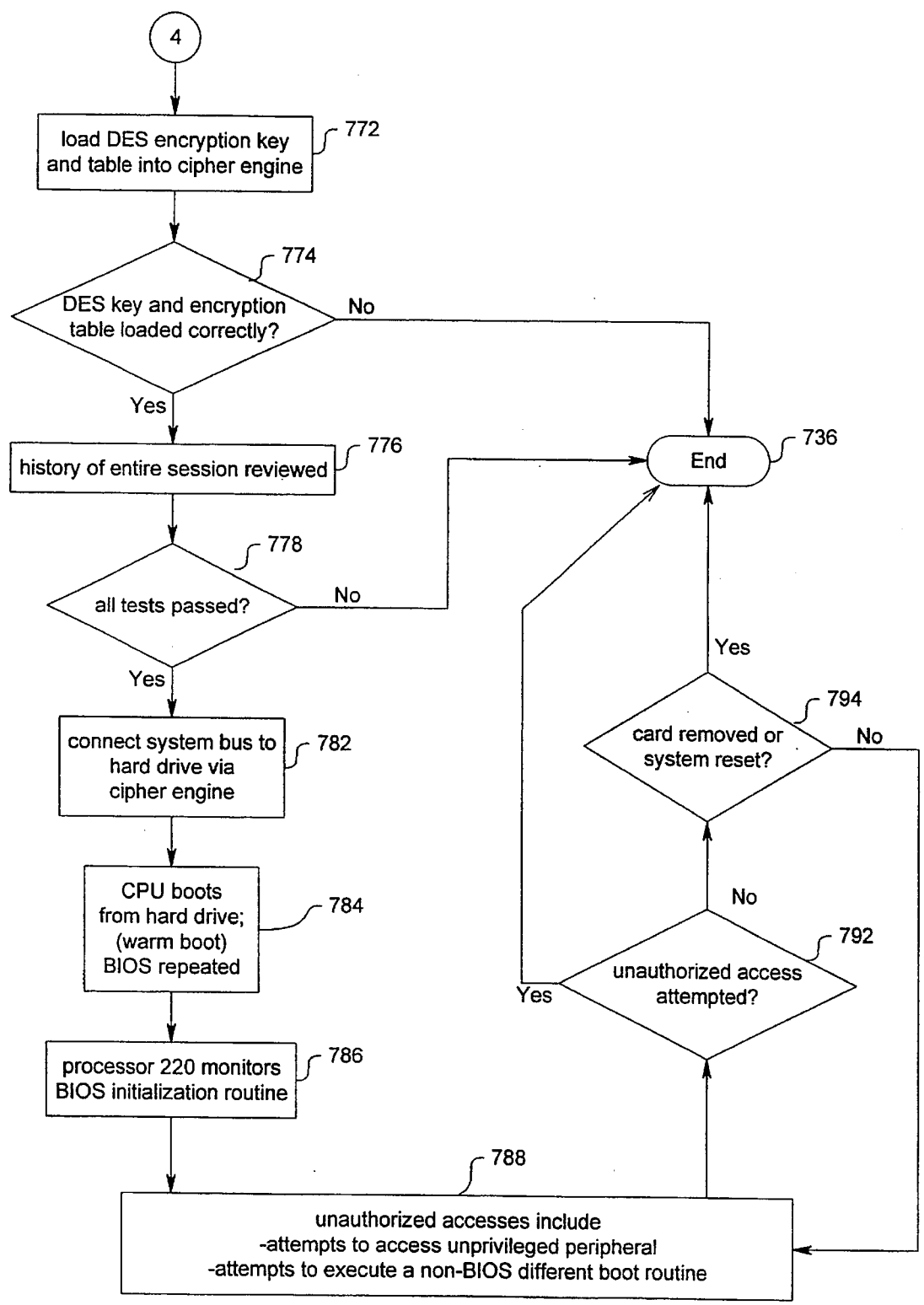

As can be seen in FIG. 6, ROM 280 contains loader program code 610 and verification program code 620 used by the CPU 290 upon initialization to load and execute the verification program. Since standard BIOS routines attempt to boot from the C: drive the use of ROM 280 in concert with processor 220 and control ASIC 230 to simulate a C: drive allows the present invention to be used in the standard IBM compatible personal computer without having to modify the system BIOS (basic input/output system).

Card 115 is used with card reader 111 under control of processor 220 to provide the computer system 100 with information concerning DES key encryption, verification questions and answers, user access privilege level, expiration date, origin of card issuance, and card usage history. As in the first embodiment, the preferred card 115 is a MICRO CARD® or GEMPLUS® card (for example, Scot 100, TB100, or COS IC cards), which is compatible with ISO 7816. One skilled in the art would readily recognize that other IC cards which conform to this standard and provide data encryption and decryption functions may be substituted without materially modifying the spirit and scope of the present invention.

LOGICAL & PHYSICAL DESTRUCT HARDWARE

Control ASIC 230 also monitors attempted unauthorized retrieval of data from the protected storage devices and presents information to processor 220 if control ASIC 230 detects an attempted unauthorized access. Processor 220 monitors signals from the control ASIC 230 and commands control ASIC 230 to issue a command to either logically or physically destroy protected information in RAM 260 or secure hard drive 113. Logical destruction of data on the RAM 260 is accomplished by asserting trigger signal 211 emanating from processor 220, clearing the contents of RAM 260. Logical destruction of the sensitive data on hard drive 113 follows naturally, since the DES encryption key synthesis information is destroyed when the RAM 260 data is destroyed, and, without the DES key, the information on hard drive 113 is logically irretrievable. Physical destruction of data can also be accomplished by asserting physical destruct signal 212 emanating from processor 220, as a means of triggering a physical destruct package 213. As in the first embodiment, several physical destruct packages are disclosed in the prior art, such as a ferric chloride spray or plastic explosive package.

Card reader interface board 109 also contains an extra defense against physical tampering. In one embodiment, a transistor circuit 210 is used to rapidly erase the contents of dynamic RAM 260. In such an embodiment, circuit 210 grounds the power pin of RAM 260 to erase the contents of RAM 260. In normal operation, trigger signal 211 is not asserted, thereby allowing the collector of transistor circuit 210 to remain at a voltage of approximately Vcc. In this mode of operation RAM 260 is powered by the supply voltage Vcc whereby current travels through diode 261 and fuse 263 to RAM 260. If power is interrupted the battery 200 provides current to RAM 260 through diode 262 and fuse 263.

When the trigger signal 211 is asserted (by processor 220) the collector of npn transistor 210 is forced to a low voltage and current flowing through diode 261 is sufficient to burn the fuse 263, thereby allowing the Vcc terminal of RAM 260 to drop to zero volts and erasing the logical contents of RAM 260. Alternatively, if the battery 200 is supplying RAM 260 with current, the trigger signal 211 will cause sufficient current to flow through fuse 263 to burn fuse 263, and again, the voltage at the Vcc terminal of RAM 260 will drop to zero volts and erase the logical contents of RAM 260. Processor 220 can initiate the logical destruct feature if control ASIC 230 alerts processor 220 that an unauthorized access is being attempted.

The logical and physical destruct mechanisms described provide several different levels of data security. In one embodiment of the present invention there are five selectible security levels:
1) Freeze the computer system bus, requiring a "cold boot," (power off and then on or "reset");
2) After the contents of the integrated circuit card so that the card must be updated to be authorized for another session;
3) Clear RAM 260 of the stored kernel for the encryption key;
4) Logical destruction of RAM 260 memory, requiring reinitialization of RAM 260 before another session may be performed on the computer system; and
5) Physical destruction of computer system memory.
Other security levels are possible and those skilled in the art will recognize that combinations of these levels of security are possible without departing from the scope and spirit of the present invention.

INTERFACE BOARD CONTROL & COMMUNICATIONS

Activities on the card reader interface board 109 are coordinated in part by code "burned into" an internal ROM in processor 220 and in part by execution of an authorization verification program as detailed below. This allows processor 220 to respond to commands issued by CPU 290 during the authorization verification program execution, yet maintain security of sensitive data on card reader interface board 109 by acting as a dedicated controller of sensitive DES encryption data and authorization data. Processor 220 communicates with control ASIC 230 to control data steering network 240 and ROM 280, and controls CE 270 using commands issued on bus 222 to CE 270 via data steering network 240. Processor 220 is solely responsible for communications with card reader 111, which enhances the overall security of the present invention since sensitive data is not placed on the system bus 292 where it is vulnerable to retrieval.

Control ASIC 230 is connected to ROM 280 and data steering network 240 using bus 223 and is also connected to the monitor and freeze control lines of CPU 290 which allows control ASIC 230 to "freeze" system bus 292 upon demand by freezing the system bus 292 if a prohibited access is detected over the monitor lines. Control ASIC 230 sends a signal to processor 220's INT interrupt 221 when it freezes system bus 292 to inform processor 220 that the bus was frozen, since processor 220 is not connected to system bus 292.

Control ASIC 230 contains a counter (not shown) which counts the number of "sectors" retrieved from ROM 280 during boot and loading functions (described below) to simulate a hard drive interface to CPU 290. Processor 220 is notified by control ASIC 230 when the last byte of program information is read from ROM 280 by CPU 290. Cipher Engine 270 routing is controlled by signals from processor 220 to control ASIC 230, and may be programmed to connect port A 274 to port C 278 to allow processor 220 to communicate with system bus 292 (and CPU 290), or connect port A 274 to port B 276 to allow CPU 290 to communicate with hard drive 113 once security conditions have been satisfied, as detailed below.

Figure 4:
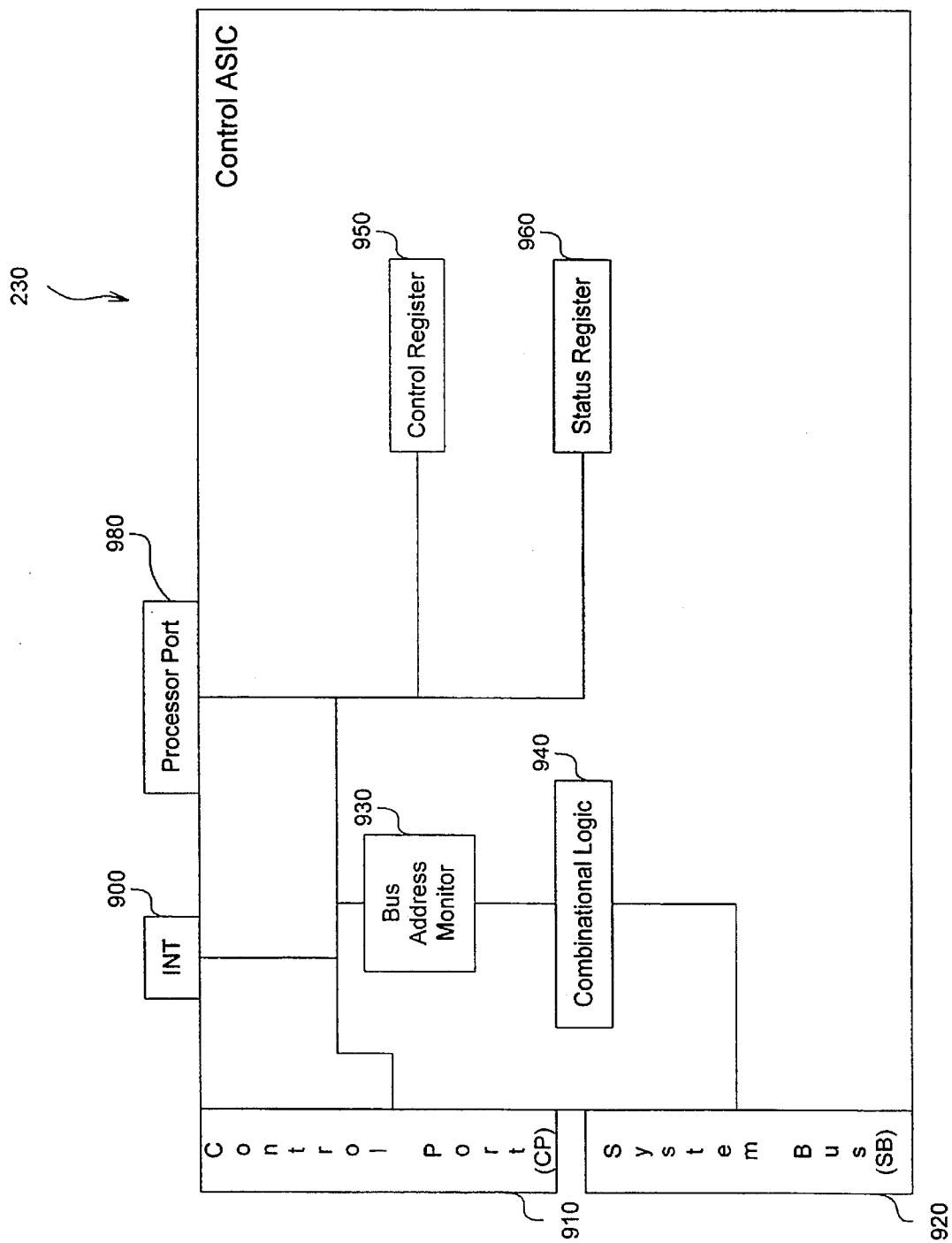
FIG. 4 is a block diagram showing the high level architecture of one embodiment of the control ASIC shown in FIG. 3.

FIG. 4 is a block diagram of the fundamental components of control ASIC 230. Control ASIC 230 includes a control register 950 with bits assigned for the control of data steering network 240 and ROM 280 via control port (CP) 910. These bits control whether bus 222 is connected to RAM 260 or CE 270 via data steering network 240. Similarly, the control bits assigned to the control of ROM 280 assist in the simulation of a C: drive during the BIOS initialization which is detailed below. Control register 950 is programmed by instructions from processor 220, and the status of the control bits may be determined by reads from processor 220 of status register 960 via processor port 980. INT port 900 is also connected to the control and status registers, and indicates when the system bus 292 is "frozen" when a security violation is detected as described above.

In one embodiment of the present invention, processor 220 programs registers (not shown) in bus address monitor 930 by transmitting mask words to these registers via processor port 980. Each mask word comprises a programmable template identifying authorized peripherals for the particular user as defined by the card 115 when issued by the security administrator during the authorization visit, described below in the SECURITY ADMINISTRATOR AUTHORIZATION VISIT section. Control ASIC 230 is connected to system bus 292 (as shown in FIG. 3) via bus port 920, and can therefore monitor the attempted accesses on system bus 292 and compare them with the templates stored in bus address monitor 930 using combinational logic 940 to determine if an unauthorized peripheral access has been attempted. If an unauthorized peripheral access is attempted one embodiment of the present invention will freeze the system bus 292; secure computer system 100 remains unusable until a power cycle of computer 100 (to reset computer 100) is performed. Port 920 of control ASIC 230 is connected to hard drive controller logic 710, as shown in FIG. 3, in order to control access to hard drive 113 in a manner known to those skilled in the art.

Bus address monitor 930 monitors system bus 292 references to peripheral devices such as serial and parallel ports, networks, and A or B floppy disks. Bus address monitor 930 monitors normal BIOS references during initialization, such as reset, warm, or power-up boot, and monitors to detect attempted prohibited accesses to denied peripheral devices as defined on card 115 during the authorization visit (see SECURITY ADMINISTRATOR AUTHORIZATION VISIT section below).

DATA STEERING NETWORK

Data steering network 240 is shown in a simplified block diagram in FIG. 5. Data steering network 240 essentially acts as a bidirectional, eight bit parallel, steerable data channel. Control ASIC 230 can control whether the eight bit bus 222 from processor 220 is connected to RAM 260 or CE 270 by decoding the address on bus 222 and selecting input 20 of the data steering network 240. Control ASIC 230 can also disable the data steering network 240 by toggling enable input 30 of data steering network 240. This operation also ensures that CE 270 is never directly connected to RAM 260 via data steering network 240, adding to the protection of data stored in RAM 260.

TYPES OF CARDS AND THEIR FUNCTION

There are essentially three types of cards: maintenance, issuer, and user cards. The maintenance card allows the user to access the system only for diagnostic purposes, but no sensitive data is accessible using the maintenance card. An issuer card is the topmost card of the security hierarchy. It enables the issuing program to configure a plurality of subordinate user cards. In one embodiment, user cards can create subordinate user cards and allow the user to access peripherals per privileges granted by the issuer during card configuration. The user cards enable users to access the secure information on computer 100.

Figure 8:
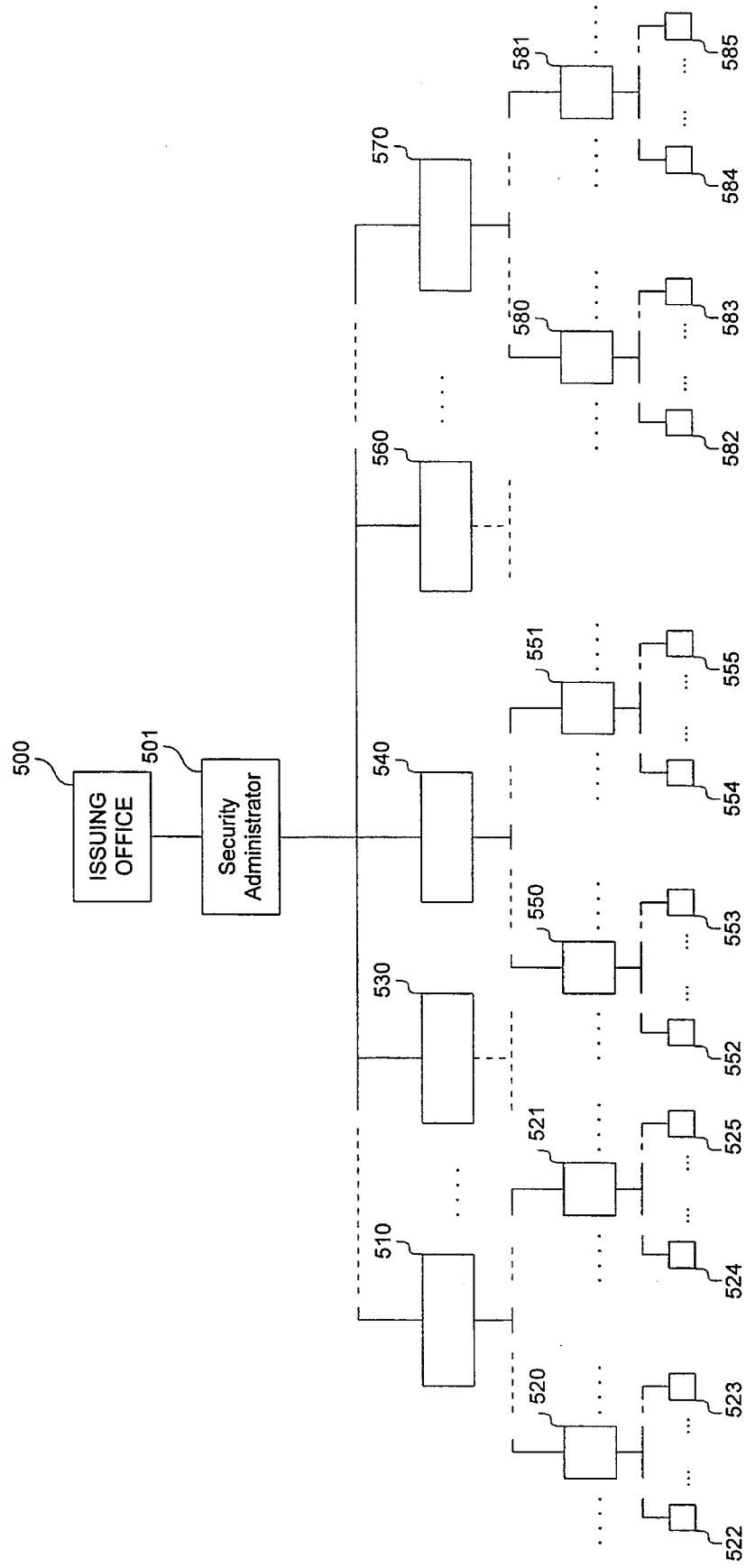
FIG. 8 is a block diagram showing a hierarchy of access for users of a secure computer system.

One embodiment of the security hierarchy is shown in FIG. 8. Box 500 represents an issuer card called the issuing office card. Box 501 is also an issuer card called the security administrator's card. The issuing office card 500 is used to create the security administrator's card 501, which in turn creates subordinate user cards represented as the remaining boxes in FIG. 8. In this embodiment, the issuing office card 500 may not access data in computer system 100; its purpose is to create subordinate user cards, such as cards 510, 530 and 540.

SECURITY ADMINISTRATOR AUTHORIZATION VISIT

The next section of the specification of the present invention requires a discussion of the information stored on the user card 115 prior to the first use of the card 115 by a user. A special card issue program is run on a computer system 100, as shown in FIG. 1D, which programs the user card 115 pursuant to ISO 7816 specifications. This programming is typically done by a security administrator who is responsible for determining the scope of authorization of the particular user. Such a session is called an authorization visit.

The card issue program used to conduct an authorization visit will store in separate registers located on card 115: expiration date of the card; the code associated with the issuing office; the peripherals which this particular user may access with this card; a code identifying the card as a maintenance card, issue card, or user card; the level of authorization of the user of the card (see the ACCESS HIERARCHY discussion of FIG. 8, below); a series of questions used to identify the user; and their associated answers.

A "first use" register is also dedicated to indicating whether the card has been used before to allow the system to identify first use. First use presents an opportunity to configure computer system 100 by storing in RAM 260 sensitive data pertaining to the specific user. In the event the information on RAM 260 is erased, the first use register indicates that the card 115 was used at least once and the user will be required to report to the security administrator to have the card reissued before secure computer system 100 will accept it.

A retry counter register is also programmed during the authorization visit which contains a value specifying the number of errors a potential user can make in answering the user identification questions before the system terminates the verification process. In addition, certain information is stored in the card automatically under ISO 7816 specification, such as the type of card which is being used (for example, MICRO CARD® or GEMPLUS® cards) and the amount of memory available on the particular card. One skilled in the art would readily recognize that the information stored on the card may be stored in other configurations without materially modifying the scope and spirit of the present invention. For example, the number of questions may be varied without materially changing the invention.

QUESTIONS AND ANSWERS USED FOR IDENTIFICATION VERIFICATION

A series of questions are posed in a consistent format, and the answers are recorded to identify a particular user. For example, one question the user might be asked is: "What is your favorite color?" The user should respond with a text string entry which matches the prerecorded answer. Therefore if the user responds: "Blue", but the answer was prerecorded as "B@L$U*E!", the response will be incorrect and depending on the value set in the retry counter, the user may be denied access or allowed to answer another question. One embodiment of the present invention uses fifteen questions to identify the user. Such an approach reduces the chance an unauthorized user can acquire the correct responses through surreptitious means. It should be obvious that any subcombination of the fifteen questions may be used for identification purposes. In one embodiment of the present invention, a random number generator decides the number of questions to ask (minimum three), and the particular questions selected. However, it is clear that the number of questions and their selection process may be altered without materially altering the scope of the present invention.

INITIALIZATION OF THE SECURE COMPUTER SYSTEM

FIG. 7 shows a flow diagram detailing the procedure by which the present invention acquires control of the computer for user identification and verification purposes upon an initialization such as power up, clear, or warm boot reset. Those skilled in the art will readily appreciate that minor modifications to the order or exact implementation of the following steps will not materially modify either the scope or spirit of the present invention. Upon initialization, at step 704 the standard computer BIOS will query the computer system to determine the present configuration of the system. Processor 220 is programmed to monitor and save BIOS routine calls made by the secure computer system's BIOS during step 704. Control ASIC 230 assists processor 220 in monitoring and memorizing the BIOS routine calls. The memorized calls are then used as a template for comparison purposes to ensure that subsequent reboot of the computer system with the standard operating system conforms with the initial pattern. Such a check verifies that the system BIOS is, indeed, in control of the subsequent reboot process. This prevents loading of another system BIOS to bypass the security system in order to access sensitive data.

As detailed above, the hardware present on card reader interface board 109 is designed to simulate the presence of a hard drive. At initialization, CPU 290 executes the standard BIOS routine of loading the first "one and/or two sectors" from the C: drive. Card reader interface board 109 intercepts the read issued by CPU 290 and directs it to ROM 280. As is illustrated in FIG. 6, ROM 280 contains loader program code 610. Therefore the first one or two sectors of the "C: drive" are read from ROM 280. (Whether one or two sectors are loaded depends on the type of CPU 290, speed of CPU 290, and type of BIOS used by the computer system.) Loader program code 610 is then executed by CPU 290 to retrieve, at 709, the remaining "sectors" of ROM 280. Those sectors contain a verification program (620 of FIG. 6) used to verify the authorization of the user to access the system. Control ASIC 230 monitors the loading process, informing processor 220 at step 712 when the last byte of code is loaded into CPU 290 so that processor 220 is aware that the verification program is about to execute on CPU 290. Processor 220 then generates, at step 713, unsolicited card status from card reader 111. Meanwhile, at 714, CPU 290 executes verification program 620. When unsolicited card status has been retrieved, processor 220 instructs control ASIC 230 to connect processor 220 to system bus 292 via data steering network 240, CE 270, and hard drive controller logic 710 (step 721). Processor 220 then transmits the status of card reader 111 to CPU 290, however, the verification program will loop until unsolicited card status is received from processor 220 (step 722).

USER AUTHORIZATION VERIFICATION PROCEDURE

At this point, the processor 220 is actually controlling system bus 292 using handshaking lines, yet processor 220 is responding to requests made by CPU 290 throughout the execution of the verification program. CPU 290 receives an interrupt indicating that a card was inserted, and whether a conductive card is present (steps 724 and 728). If no card is present, then a message to "insert card" is flashed to the operator on display 105 (step 726). If the card 115 is conductive, then the system bus 292 is frozen and the verification process is terminated (step 736). If the card 115 is nonconductive, then power is applied to the card reader 111 (step 729). Upon powerup, the card 115 issues an unsolicited reset message which is transferred to the CPU 290 by processor 220 (step 732). Processor 220 resets card reader 111 by holding the RST signal (224 of FIG. 3) low (active) for a specified time as defined by ISO 7816-3, and then raises the signal to indicate end of reset to card 115. Card 115 issues a reset message to processor 220 via card reader 111 which identifies whether the type of card being used is MICRO CARD® or GEMPLUS® (per ISO 7816, MICRO CARD® and GEMPLUS® Technical Manuals) (step 734). If the card 115 is not an acceptable card, then processor 220 freezes the system bus 292 and terminates the authorization process (step 736). If the card is accepted as potentially valid then the verification program determines if the card was issued by the correct issuing office (step 742). The expiration date is also retrieved from the card by processor 220, but must be sent to CPU 290 because processor 220 does not have a clock/calendar to compare the expiration date (step 744). If either of the tests in steps 742 or 744 fail, then system bus 292 is frozen by processor 220 and the verification process is stopped (step 736). If the card 115 meets the previous tests, then CPU 290 instructs processor 220 to read several questions and their associated correct responses from the card 115 and load them into RAM 260 (step 746). In one embodiment of the present invention, the answers are stored in the secure area of RAM 260 and the questions, which are nonsensitive, are stored in the open area of RAM 260. The user is then queried for responses to questions read from card 115 and must answer the questions correctly to gain access to the computer. The first question is displayed to the user (step 748), an operator response is received by CPU 290, formatted, sent to processor 220, and compared by processor 220 with the answers stored in the secure space of RAM 260 (steps 752 and 754). A retry counter located in processor 220 is incremented each time an error is made in answering the questions, and is preprogrammed by the security administrator to terminate the verification program if the number of erroneous responses exceeds the preprogrammed value (steps 758 and 736). This protection is installed to prevent an unauthorized user of a card from repeated guesses of the correct answers to the posed questions.

After the last question is asked (step 762) the DES encryption key is calculated (step 764). In one embodiment of the present invention, the key is calculated using user unique binary information stored on the card 115 and in the RAM 260. This allows the program to calculate unique keys even if the key generation equation is identical from user to user, since the inputs identifying each user will be dependent on the answers given by the user, and therefore, the calculated key will be unique. Another embodiment of the present invention will have the verification program prompt the user with an additional question to assist in the key randomization process. Alternate embodiments of the present invention could insert such a question at any point in the verification program prior to the key generation step. In one embodiment of the present invention, the key generation algorithm is given by the pseudocode shown in TABLE 1:

TABLE 1

BEGIN:
  read the binary data from card 115 associated with the prerecorded questions and answers;
  reduce the binary value by powers of nine;
  store the carries generated in a register to form a random number;
  exclusive or the random number generated in the previous step with data stored in RAM 260 of secure computer system 100 to generate 16 strings of 64 bits, which will serve as potential keys for encryption;
  load the sixteen keys into CE 270;
  generate a random number between 1 and 15;
  select one of the sixteen keys using the random number;
  use that key for encryption purposes;
END.

However, it will be clear to those skilled in the art that other formulas may be used without materially modifying the spirit and scope of the present invention.

After the key is generated, it will be loaded, along with an encryption table, into the CE 270 (step 772), so that the CE 270 will be ready for encryption if the test of the loading is passed (step 774). If the table is not loaded correctly, then the verification program will terminate (step 736). If the table is loaded correctly, the processor 220 reviews the entire history of the verification sequence (776) to ensure that all of the required tests have passed (778) before connecting the system bus 292 to CE 270 (782). If, at 778, all required tests have not passed correctly, the verification program is terminated at step 736. Otherwise, the CPU 290 will then boot from hard drive 113 in order to execute the disk operating system for secure computer 100 (step 784). Processor 220 monitors this reboot process using control ASIC 230 to monitor the BIOS routine calls to ensure that the native system BIOS is properly rebooting the computer from hard drive 113 (step 786). If any unauthorized accesses are attempted, system bus 292 is frozen and the verification program terminates (steps 792 and 736). Unauthorized accesses include: unauthorized access of peripheral (monitored by bus address monitor 930 on control ASIC 230), and attempts to boot from the A: instead of C: drive (monitored by processor 220), (step 788). If no unauthorized accesses are detected, the program will allow the user to use disk drive 113 until the session is terminated by the user via removal of card 115 or system reset (step 794). Once the user is done, system bus 292 will be frozen and the computer 100 must be power cycled (to reset computer 100) before another session can take place (step 736).

ACCESS HIERARCHY

FIG. 8 shows one embodiment of a hierarchy of secured access codes among a multiuser organization. The present invention teaches a hierarchy coding method used to generate families of access codes which permit horizontal and vertical segregation of access codes within an access hierarchy. As shown in FIG. 8, the access code is designed to allow a superior of a subordinate user access to the computer of the subordinate, but only if the superior has access in the same vertical portion of the user hierarchy. For example, referring to FIG. 8, user 520 cannot access the information on user 510's computer (520 is subordinate to 510), but can access the information on the computers of users 522. However, user 520 has no access authority over user 550 (no horizontal access privilege), nor does user 520 have access authority over users 552 (lacking vertical commonality). A benefit of such organizations of key information is that access may be limited in an organized and restricted hierarchy. For example, if somehow security is compromised in the middle branch of FIG. 8, then the left and right branches are not compromised.

A vast array of users may therefore be accommodated easily within the hierarchy shown in FIG. 8 by dedicating access code words to each level. In one such embodiment, sixty-four (64) bits are allocated to the access code word describing 510 level, allowing $2^{64}$ unique codes at 510 level; sixty-four (64) bits are allocated to the access code word describing level 520, allowing $2^{64}$ unique codes at the 520 level; and sixty-four (64) bits are allocated to the access code word describing level 522, allowing $2^{64}$ unique codes at the 522 level. These bits may be stored on card 115 in dedicated registers and assigned by the security administrator during the authorization visit.

The horizontal separation of users may be easily attained by including an extra question in the list of queries posed and answered during the verification program execution. An answer could be predetermined which would be common among all users in a common vertical group, and which would segregate them from other users in other vertical groups. For example, each individual vertical group would be identified by a unique, predetermined response to the same question. The response could be mapped to a binary number, which could serve as a consistent offset for purposes of generating the access code. For example, if a question asked for a favorite sport, the response "golf" could be used by all members of a particular vertical group to identify their group.

In one embodiment of the present invention, fifteen (15) questions are used to identify the user, an extra question is used to identify the particular vertical branch of the access tree the user resides. These questions are employed to select the DES encryption keys available to the user. In this way, the DES encryption key questions serve as a further randomization of the access code which is user dependent.

Essentially, access information is distributed between the user (in the preprogrammed responses generated by that user), the card 115 (programmed when the individual is given access authority), and RAM 260 stored on card reader controller board 109. Therefore, in one embodiment of the invention, the access code is a combination of the user, the card, and the computer which the user uses. This provides for a high level of security for the entire system, and requires that the user be re-authorized by the security administrator every time the user's access privileges are lost due to incorrect or improper attempted access. In this way, security administrators can control the access attempts by the users since they are informed each time a potential security breach is encountered; users must be re-authorized if the identification information in RAM 260 is destroyed by attempted unauthorized access.

DESTRUCTION OF DATA

Logical destruction of the data resident on the various memory storage devices found on the computer system may be preprogrammed to occur after a fixed number of failed attempted accesses (see FIG. 7 discussion of retry counter, step 758). In one embodiment, board 109 goes further and freezes the system bus 292 to prevent unauthorized retrieval of sensitive information following detection of a potential security breach. The data stored in hard drive 113 is logically destroyed when the DES encryption key is erased since the key cannot be reconstructed by the intruder. Therefore, if the key information in RAM 260 is destroyed, it is equivalent to rendering the data stored in hard drive 113 logically destroyed, since without the encryption key it is undecipherable. In one embodiment of the present invention, the DES key kernel information stored on RAM 260 is destroyed by clearing RAM 260 using an algorithm executed by processor 220 upon detection of attempted unauthorized access, or by grounding the power pin of RAM 260 using transistor circuit 210 as described in the section LOGICAL & PHYSICAL DESTRUCT HARDWARE, above. A further hurdle requires that any user whose card 115 is invalidated by unauthorized access visit the security administrator to get their card reinstated. Physical destruction of the data storage media is also possible by asserting physical destruct signal 212 generated by control ASIC 230 under control of processor 220 in the event of a breach, triggering destruct package 213 designed to physically destroy the hard drive 113 and RAM 260.

Alternate embodiments of the destruction means of the present invention are also possible. In one embodiment, the selection of destruction means and the process by which the destruction methods are invoked are programmed by altering the code in the internal ROM of processor 220 or by varying the value of retries allowable on the register of card 115. Therefore, one embodiment of the present invention is not limiting and does not materially limit the scope of the present invention.

Figure 9A:
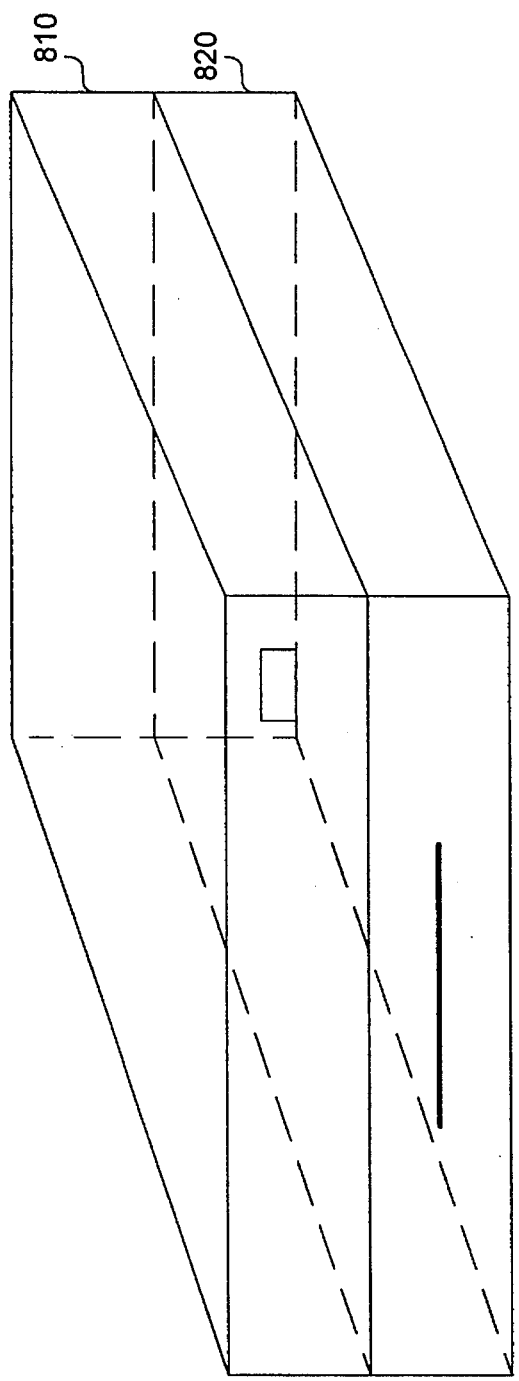
FIG. 9A and FIG. 9B illustrate a pictorial display of one embodiment of a mounting scheme used to co-locate a card reader and hard drive.
Figure 9B:
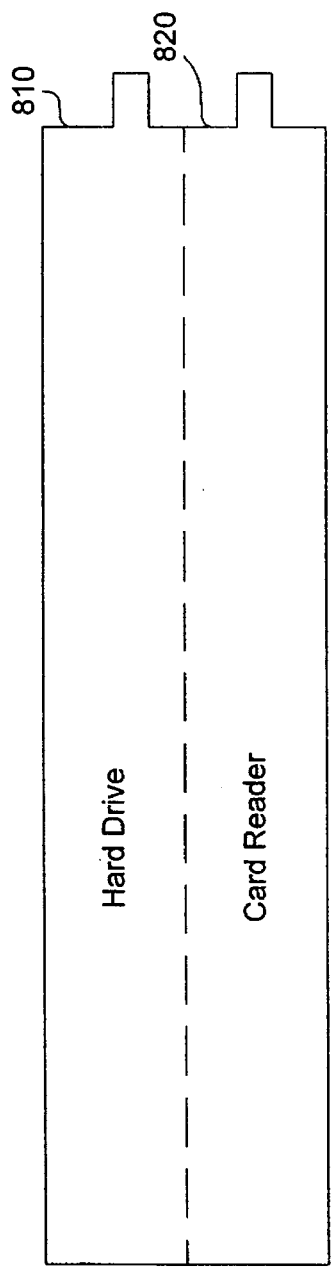

FIG. 9 illustrates one embodiment of the present invention showing a card reader receptacle 820 mounted with a hard drive 810 to facilitate physical mounting of the card reader and a resident hard drive. For example, a hard drive 113 can be co-located with a card reader 111 to form a single unit comprising a secured disk drive as shown in FIG. 9.

This mounting scheme illustrates only one of several possible embodiments of the mechanical mounting of the card reader receptacle 820 in the present invention. Other embodiments illustrating the mechanical mounting of card reader receptacle 820 are possible without materially modifying the scope of the present invention.

Those skilled in the art will readily see that the present invention offers several benefits over other devices including but not limited to the ability of one embodiment to provide three levels of computer security. For instance, one embodiment of the present invention provides security in three distinct ways:

(1) immediately asserting control of the computer system upon initialization in the form of preboot protection, since the card reader interface board simulates the C: drive loader code before an intruder can interrupt the system and thereby immediately takes control of the CPU;

(2) after preboot control is acquired a user verification program is executed to ensure that the user is authorized to access the computer; and (3) ongoing monitoring of computer activity as the computer system is in use, to detect attempted unauthorized accesses using a bus address monitor and destroy sensitive program and encryption key information before an intruder can break into the system.

Those skilled in the art will readily appreciate that the scope of the present invention is not restricted to securing personal computers, but may be extended to securing other types of computer systems (larger or smaller) or specific peripherals of both small and large computer systems. Additionally, the present invention may be employed to secure the digital data stored on any system which stores sensitive digital information.

The present invention discloses the use of the card reader interface board 109 in conjunction with hard drive 113. It should be apparent, however, that the same type of security could be applied advantageously to control the contents of other nonvolatile memory such as a compact disc (CD) ROM system, Personal Computer Memory Card International Association card (PCMCIA card), or streaming tape backup unit. Indeed, the present invention can be applied advantageously to control access to any peripheral which could be connected to a computer system. For instance, the present invention could be applied to secure subsections of mass storage devices, such as partitioned hard drives or PBX switches. Alternate encryption methods, larger or smaller data and address buses, alternate integrated circuit cards and readers, and modifications to the control algorithms employed in the present invention may also be used without materially altering the scope and spirit of present invention.

It is to be understood, however, that even though numerous characteristics and advantages of the invention have been set forth in the foregoing description, together with details of the structure and function of the invention, the disclosure is illustrative only, and changes may be made in detail, especially matters of shape, size, and arrangement of parts within the principles of the invention, to the full extent indicated by the broad general meaning of the terms in which the appended claims are expressed.

What is claimed is:

1. A method of operating a computer having a central processing unit, the central processing unit executing a boot program to initialize the computer, the method comprising the steps of:

a) prior to completion of the boot program, acquiring control of the central processing unit;

b) loading a verification program;

c) upon attempted access by a user, verifying that the user is authorized using the verification program; and d) controlling access to the computer by monitoring system calls.

2. The method of claim 1, further comprising the step of if the user is not authorized, prohibiting access to the computer.

3. The method of claim 1, wherein the step of verifying that a user is authorized comprises the steps of:

reading and comparing a plurality of sources of identification information for identifying an authorized user; and comparing responses from the plurality of sources to determine if the user is authorized.

4. The method of claim 1, further comprising the steps of:

constructing an encryption key from a plurality of sources of identification information; and encrypting information stored in the computer using the encryption key.

5. The method of claim 1, wherein the step of controlling access to the computer comprises the steps of:

monitoring and storing system calls made by the central processing unit while loading the verification program; and if the user is verified as an authorized user,
booting the computer system;
monitoring and storing system calls made by the central processing unit while booting;
comparing system calls stored while loading the verification program with system calls stored while booting; and
if the system calls do not match, locking the computer to prohibit further access and require reinitialization and reauthorization to access the computer.

6. The method of claim 1, further comprising the steps of:

incrementing a counter representing a number of attempted unauthorized accesses;

if the number of attempted unauthorized accesses exceeds a predetermined number, then logically destroying data stored in the computer.

7. The method of claim 1, further comprising the steps of:

incrementing a counter representing a number of attempted unauthorized accesses;

if the number of attempted unauthorized accesses exceeds a predetermined number, then physically destroying data stored in the computer.

8. The method of claim 1, wherein the system calls are basic input/output operating system (BIOS) calls.

9. A method for protecting information stored in a computer, comprising the steps of:

a) interfacing an information bearing card to the computer;

b) storing individualized questions and individualized answers which uniquely identify a user on the information bearing card;

c) reading identification information and card information from the information bearing card;

d) executing a verification routine upon initialization of the computer to determine whether a potential user is authorized to access information stored in the computer, wherein the verification routine comprises asking the potential user the individualized questions and comparing answers received against the individualized answers; and e) if the potential user correctly answers the questions, permitting access to the computer.

10. The method according to claim 9, further comprising the step of if the user does not correctly answer the questions, freezing the computer.

11. The method according to claim 9, further comprising the step of programming the information bearing card with individualized access privilege information to identify which portions of the computer the user is privileged to access.

12. The method according to claim 9, wherein the step of permitting access comprises the steps of:
   a) verifying that the user is privileged to access the information stored in a particular storage device; and
   b) if the user is privileged to access the information stored in the particular storage device, permitting access to information stored in the particular storage device.

13. The method according to claim 11 further comprising the step of if the user attempts to access information from an unprivileged storage device, freezing the computer and forcing the user to reset the computer system and begin authorization verification again.

14. The method according to claim 9, wherein the step of reading further comprises the steps of:
   incrementing a retry counter if the user incorrectly answers a question; and
   if the retry counter has reached a predetermined value, terminating the authorization procedure.

15. The method according to claim 9, wherein the step of reading further comprises the steps of:
   a) reading a card identification code from the card indicating card type;
   b) determining a card type from the card identification code; and
   c) if the card is a maintenance card, allowing limited access to the computer for maintenance purposes.

16. An interface for a computer, the computer comprising a central processing unit (CPU), a system bus, and memory, the interface comprising:
   a program code stored in a nonvolatile system boot memory device, for causing the CPU to execute a verification program rand acquire control of the system bus and CPU substantially immediately after commencement of initialization of the computer and prior to completion of initialization of the computer;
   an encryption system to encrypt data stored in memory; and
   a bus monitor circuit for detecting unauthorized accesses of the system bus.

17. The interface of claim 16 further comprising a device for logically destroying data stored in the computer.

18. The interface of claim 17 wherein the device logically destroys encryption key information.

19. The interface of claim 17 wherein the device logically destroys data in memory.

20. The interface of claim 16 further comprising a device for physically destroying data stored in the computer.

21. The interface of claim 16, the interface further comprising:
   a secure bus, interconnecting the interface to memory; and
   a card reader bus, interconnecting the interface to a card reader.

22. A secure computer, comprising:
   a central processing unit (CPU);
   a system bus;
   memory; and
   an interface, the interface comprising:
      a program code stored in a nonvolatile system boot memory device, for causing the CPU to execute a verification program and acquire control of the system bus and CPU substantially immediately after commencement of initialization of the computer and prior to completion of initialization of the computer;
      an encryption system to encrypt data stored in memory; and
      a bus monitor circuit for detecting unauthorized accesses of the system bus.

23. The secure computer of claim 22, further comprising a device for logically destroying data stored in the computer.

24. The secure computer of claim 23, wherein the device logically destroys encryption key information.

25. The secure computer of claim 23, wherein the device logically destroys data in memory.

26. The secure computer of claim 22, further comprising a device for physically destroying data stored in the computer.

27. The secure computer of claim 22, the interface further comprising:
   a secure bus, interconnecting the interface to memory; and
   a card reader bus, interconnecting the interface to a card reader.

28. A secure computer, comprising:
   a central processing unit (CPU);
   a system bus:
   memory; and
   interface means, the interface means comprising:
      program code stored in a nonvolatile system boot memory device, for causing the CPU to execute a verification program and acquire control of the system bus and CPU substantially immediately after commencement of initialization of the computer and prior to completion of initialization of the computer;
      encryption means for encrypting data stored in memory; and
      bus monitor means for detecting unauthorized accesses of the system bus means.

29. The secure computer of claim 28, further comprising means for logically destroying data stored in the computer.

30. The secure computer of claim 29, wherein the means logically destroys encryption key information.

31. The secure computer of claim 29, wherein the means logically destroys data in memory.

32. The secure computer of claim 28, further comprising means for physically destroying data stored in the computer.

33. The secure computer of claim 28, the interface means further comprising:
   a secure bus, interconnecting the interface to memory; and
   a card reader bus, interconnecting the interface to a card reader.

* * * * *